US012663961B2

(12) United States Patent
Jo et al.

(10) Patent No.: US 12,663,961 B2
(45) Date of Patent: Jun. 23, 2026

(54) METHOD FOR PROVIDING INFORMATION BY IDENTIFYING TYPE OF INPUT, AND ELECTRONIC DEVICE FOR SUPPORTING SAME

(71) Applicant: Samsung Electronics Co., Ltd., Suwon-si (KR)

(72) Inventors: Nammin Jo, Suwon-si (KR); Seungnyun Kim, Suwon-si (KR); Jihyun Kim, Suwon-si (KR); Jongmin Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/815,542

(22) Filed: Aug. 26, 2024

(65) Prior Publication Data

US 2024/0419397 A1 Dec. 19, 2024

Related U.S. Application Data

(63) Continuation of application No. PCT/KR2023/002528, filed on Feb. 22, 2023.

(30) Foreign Application Priority Data

Mar. 31, 2022 (KR) ........................ 10-2022-0040632
Jul. 29, 2022 (KR) ........................ 10-2022-0094851

(51) Int. Cl.
*G06F 3/16* (2006.01)
*G06F 3/01* (2006.01)
(52) U.S. Cl.
CPC .............. *G06F 3/165* (2013.01); *G06F 3/017* (2013.01)

(58) Field of Classification Search
CPC ...... G02B 2027/0138; G02B 2027/014; G02B 27/0176; G06F 3/012; G06F 3/017;
(Continued)

(56) References Cited

U.S. PATENT DOCUMENTS 10,471,413 B2 11/2019 Mohanan et al.
10,996,922 B2 5/2021 Seo et al.
(Continued)

FOREIGN PATENT DOCUMENTS

EP 1083769 3/2001
JP H10341123 A 12/1998
(Continued)

OTHER PUBLICATIONS

International Search Report for PCT/KR2023/002528 mailed May 24, 2023, 6 pages.
(Continued)

*Primary Examiner* — Richard J Hong
(74) *Attorney, Agent, or Firm* — NIXON & VANDERHYE P.C.

(57) ABSTRACT

An electronic device comprises: one or more input modules; one or more speakers; a display; at least one processor; and a memory storing instructions. When executed by the at least one the instructions cause the electronic device to: obtain an input through the one or more input modules; identify the type of input; determine whether to output, through the one or more speakers, information corresponding to the input; and control the one or more speakers so that the information corresponding to the input is output through the one or more speakers according to the type of input based on determining that the information corresponding to the input is to be output through the one or more speaker.

18 Claims, 17 Drawing Sheets

(58) Field of Classification Search
CPC ........ G06F 3/0304; G06F 3/165; G06F 3/167;
G06F 3/0483; G06F 1/266; G10L 25/51;
G10L 15/20; G06V 40/20; H04R 1/46;
H04R 1/1083
See application file for complete search history.

(56) References Cited

U.S. PATENT DOCUMENTS

| | | | |
|---|---|---|---|
| 11,068,668 B2 | 7/2021 | Lovitt et al. | |
| 11,126,224 B2 | 9/2021 | Patton et al. | |
| 11,393,468 B2 | 7/2022 | Hwang et al. | |
| 11,881,229 B2 | 1/2024 | Han et al. | |
| 2015/0138073 A1* | 5/2015 | Hennelly | G02B 27/0176 |
| | | | 345/156 |
| 2015/0192989 A1 | 7/2015 | Kim et al. | |
| 2016/0302027 A1 | 10/2016 | Lee | |
| 2017/0243600 A1* | 8/2017 | Teshima | G10L 25/51 |
| 2018/0189568 A1 | 7/2018 | Powderly et al. | |
| 2019/0251344 A1 | 8/2019 | Menefee et al. | |
| 2020/0021674 A1 | 1/2020 | Cheng | |
| 2020/0193714 A1 | 6/2020 | Browy et al. | |
| 2020/0258539 A1* | 8/2020 | Shim | H04R 1/1083 |
| 2021/0150145 A1 | 5/2021 | Negishi | |
| 2022/0083187 A1* | 3/2022 | Caviness | G06F 3/0483 |
| 2022/0300130 A1* | 9/2022 | Caviness | G06V 40/20 |
| 2023/0102049 A1* | 3/2023 | Oh | G10L 15/20 |
| | | | 704/200 |
| 2023/0238001 A1* | 7/2023 | Westner | G06F 1/266 |
| | | | 704/235 |

FOREIGN PATENT DOCUMENTS

| | | | | | |
|---|---|---|---|---|---|
| JP | 2004004954 | A | 1/2004 | | |
| JP | 3750676 | B2 | 12/2005 | | |
| JP | 2022510752 | A | 1/2022 | | |
| KR | 20070105555 | A * | 10/2007 | .............. | H04R 1/46 |
| KR | 20150082032 | A | 7/2015 | | |
| KR | 20160022575 | A | 3/2016 | | |
| KR | 20180071384 | A | 6/2018 | | |
| KR | 20190019442 | A | 2/2019 | | |
| KR | 10-2056330 | | 12/2019 | | |
| KR | 20200031926 | A | 3/2020 | | |
| KR | 20200054354 | A | 5/2020 | | |
| KR | 102139855 | B1 | 7/2020 | | |
| KR | 102229758 | B1 | 3/2021 | | |
| KR | 20210086665 | A | 7/2021 | | |
| KR | 102324074 | B1 | 11/2021 | | |
| KR | 20210130486 | A | 11/2021 | | |
| WO | 2020036467 | A1 | 2/2020 | | |

OTHER PUBLICATIONS

Written Opinion of the ISA for PCT/KR2023/002528 mailed May 24, 2023, 4 pages.
Extended European Search Report dated Apr. 7, 2025 issued in European Patent Application No. 23781173.2.
Indian Patent Office Examination Report dated Feb. 1, 20269 for corresponding Indian patent application 202417065903.
Korean Examination report dated May 26, 2026 in connection with counterpart KR application 10-2022-0094851 (with translation).

* cited by examiner

METHOD FOR PROVIDING INFORMATION BY IDENTIFYING TYPE OF INPUT, AND ELECTRONIC DEVICE FOR SUPPORTING SAME

CROSS-REFERENCE TO RELATED APPLICATIONS

This application is a continuation of International Application No. PCT/KR2023/002528 designating the United States, filed on Feb. 22, 2023, in the Korean Intellectual Property Receiving Office and claiming priority to Korean Patent Application Nos. 10-2022-0040632, filed on Mar. 31, 2022, and 10-2022-0094851, filed on Jul. 29, 2022, in the Korean Intellectual Property Office, the disclosures of each of which are incorporated by reference herein in their entireties.

BACKGROUND

Field

The disclosure relates to a method for providing information and an electronic device supporting the same.

Description of Related Art

With the development of communication technology, electronic devices are becoming smaller and lighter to be used without significant inconvenience even when worn on a user's body. For example, wearable electronic devices, such as a head-mounted device (HMD), a smart watch (or band), a contact lens-type device, a ring-type device, a glove-type device, a shoe-type device, or a garment-type device, have been commercialized. A wearable electronic device is worn directly on the body, making it possible to improve portability and user accessibility.

An HMD is a device worn on a user's head or face, and may provide augmented reality (AR) to the user. For example, an HMD that provides AR may be configured in the form of glasses, and may provide information about an object in the form of an image or text to a user in at least a partial space within the user's field of view. An HMD may provide virtual reality (VR) for users. For example, an HMD may output independent images respectively for both eyes of a user and output content provided from an external input in the form of video or a sound for the user, thereby providing an excellent sense of immersion. Further, an HMD may provide mixed reality (MR) and/or extended reality (XR).

An HMD may receive or transmit information through an input/output device. For example, an HMD may obtain an external sound (e.g., a counterpart's voice) through a microphone. The HMD may convert the obtained voice into an image or audio form and output the voice, thereby providing information indicated by the obtained voice to a user (e.g., a hearing-impaired person) wearing the HMD. In addition, the HMD may generate information to be delivered to the counterpart via a virtual keyboard displayed on the HMD, may convert the generated information into audio, and may output the audio through an output device (e.g., speaker).

When an electronic device (e.g., an HMD) outputs information generated using a virtual keyboard as audio, the audio output through the electronic device may be indistinguishable from the voice (sound) of a user. For example, the electronic device may obtain an input via the virtual keyboard. The electronic device may convert the obtained input into text, and may output audio corresponding to the converted text through a speaker. When the user speaks while the audio is output from the electronic device, a counterpart may not distinguish the audio output through the electronic device and the voice made by the user.

The electronic device may simultaneously receive various inputs, such as the voice or facial expression of the user, along with a gesture of the user. In this case, the electronic device may process and output only an input related to the gesture of the user among the various inputs simultaneously entered, and may have difficulty processing the other inputs.

When outputs corresponding to the various inputs (e.g., the voice of the user, the gesture of the user, and the facial expression of the user) entered into the electronic device are output through one output device, the outputs corresponding to the various inputs may not be distinguished from each other.

SUMMARY

Embodiments of the disclosure relate to a method of providing information and an electronic device supporting the same capable of distinguishably outputting outputs corresponding to various inputs entered into an electronic device.

An electronic device according to various example embodiments of the disclosure may include: one or more input modules including input circuitry, one or more speakers, a display, at least one processor comprising processing circuitry, and memory storing instructions that, when executed by at least one processor individually or collectively, cause the electronic device: obtain an input through the one or more input modules, identify a type of the input, determine whether to output information corresponding to the input through the one or more speakers, and control the one or more speakers so that the information corresponding to the input is output based on the type of the input through the one or more speakers, based on determining to output the information corresponding to the input through the one or more speakers.

A method in which an electronic device provides information according to various example embodiments of the disclosure may include: obtaining an input through one or more input modules of the electronic device, identifying a type of the input, determining whether to output information corresponding to the input through one or more speakers, and controlling the one or more speakers so that the information corresponding to the input is output based on the type of the input through the one or more speakers, based on determining to output the information corresponding to the input through the one or more speakers.

A method of providing information and an electronic device supporting the same according to various example embodiments of the disclosure enables outputs corresponding to various inputs entered into an electronic device to be distinguishably output.

Effects obtainable from the disclosure are not limited to the effects mentioned above, and other effects not mentioned will be clearly understood by those skilled in the art from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
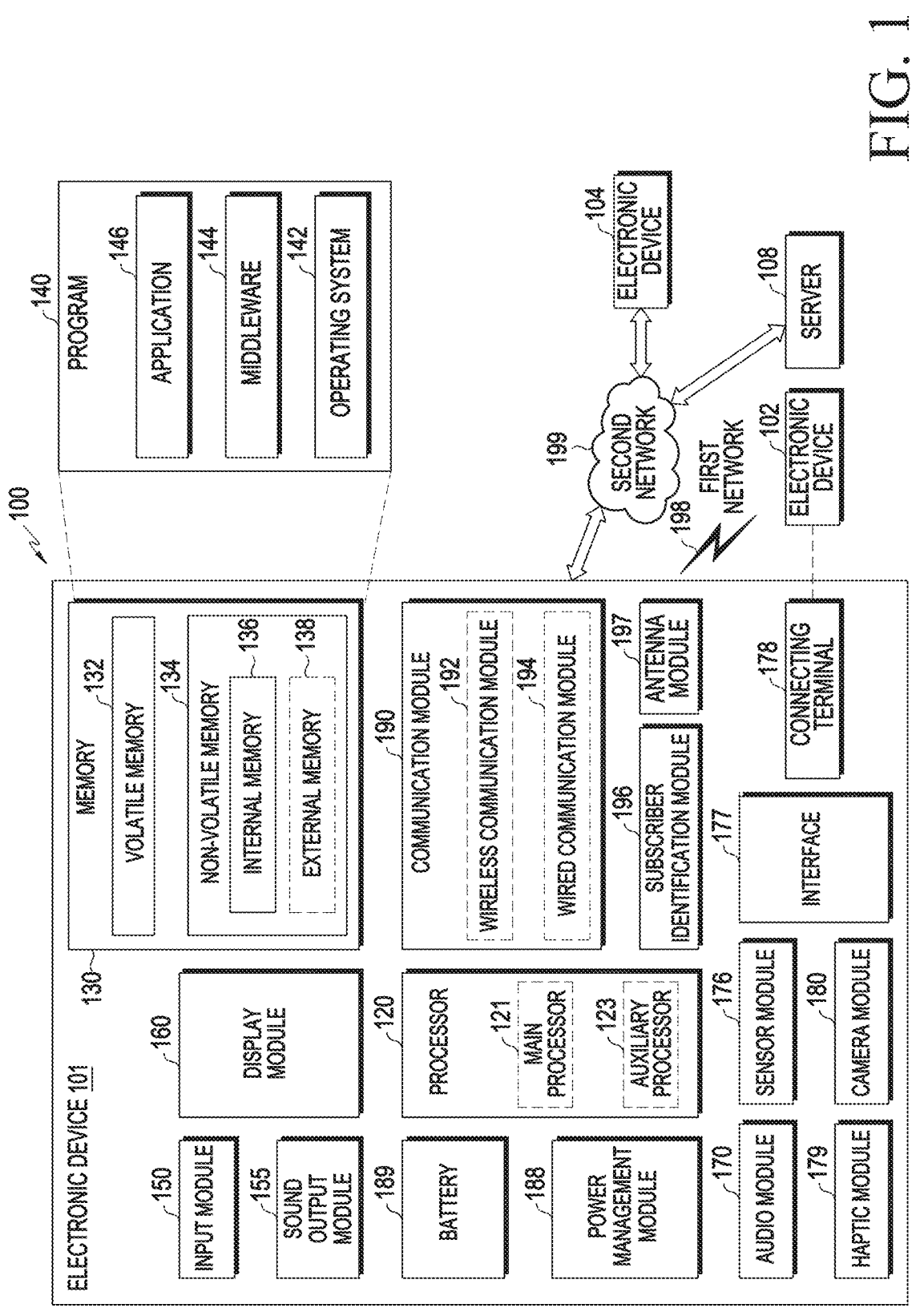
FIG. 1 is a block diagram illustrating an example configuration of an electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mm Wave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
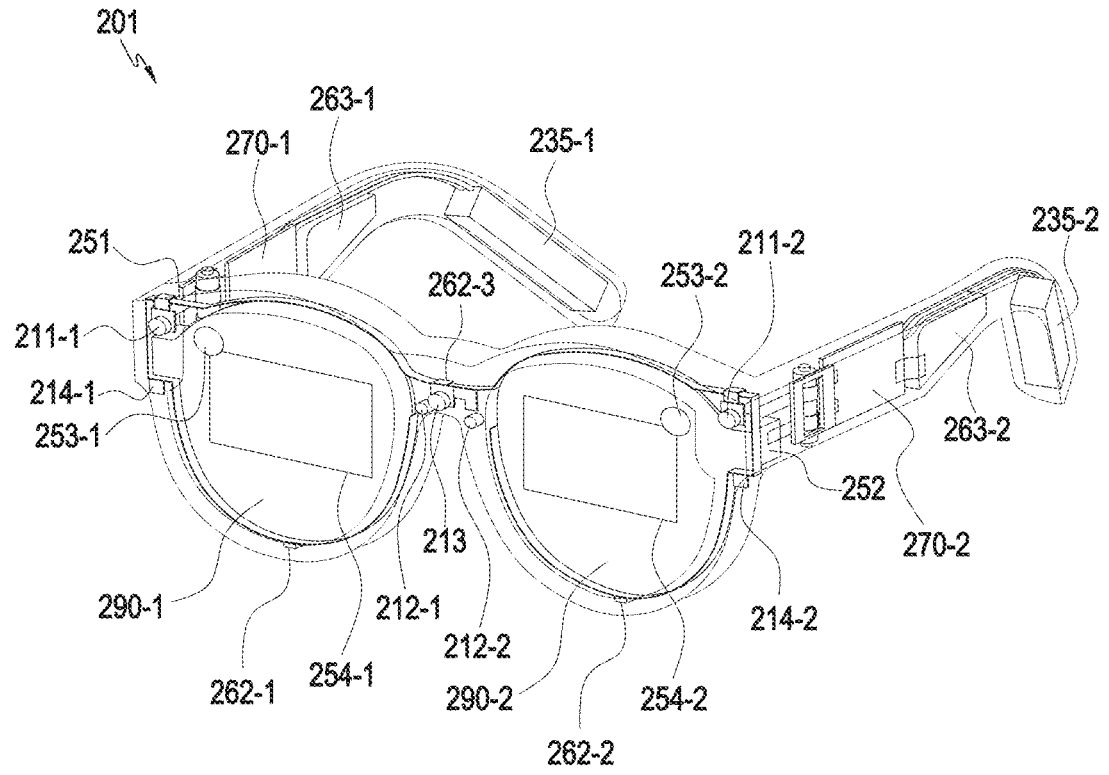
FIG. 2 is a perspective view illustrating an example structure of an electronic device according to various embodiments.

FIG. 2 is a perspective view illustrating an example structure of an electronic device 201 according to various embodiments.

Referring to FIG. 2, in an embodiment, the electronic device 201 (e.g., the electronic device 101) may include one or more first cameras 211-1 and 211-2, one or more second cameras 212-1 and 212-2, and one or more third cameras 213. In an embodiment, an image obtained through the one or more first cameras 211-1 and 211-2 may be used to detect a hand gesture by a user, to track the head of the user, and/or to recognize a space. In an embodiment, the one or more first cameras 211-1 and 211-2 may be global shutter (GS) cameras.

In an embodiment, the one or more first cameras 211-1 and 211-2 may perform a simultaneous localization and mapping (SLAM) operation through depth photography. In an embodiment, the one or more first cameras 211-1 and 211-2 may perform spatial recognition for six degrees of freedom (6DoF).

In an embodiment, an image obtained through the one or more second cameras 212-1 and 212-2 may be used to detect and track the user's pupils. In an embodiment, the one or more of the second cameras 212-1 and 212-2 may be GS cameras. In an embodiment, the one or more second cameras 212-1 and 212-2 may correspond to the left eye and the right eye, respectively, and the performances of the one or more second cameras 212-1 and 212-2 are the same.

In an embodiment, the one or more third cameras 213 may be high-resolution cameras. In an embodiment, the one or more third cameras 213 may perform an auto-focusing (AF) function and an image stabilization function. In an embodiment, the one or more third cameras 213 may be GS cameras or rolling shutter (RS) cameras.

In an embodiment, the electronic device 201 may include one or more light-emitting elements 214-1 and 214-2. In an embodiment, the light-emitting elements 214-1 and 214-2 may be different from a light source configured to emit light to a screen display area of a display, which will be described later. In an embodiment, the light-emitting elements 214-1 and 214-2 may emit light to facilitate pupil detection when the user's pupils are detected and tracked through the one or more second cameras 212-1 and 212-2.

In an embodiment, the light-emitting elements 214-1 and 214-2 may each include a light-emitting diode (LED). In an embodiment, the light-emitting elements 214-1 and 214-2 may emit light in the infrared region. In an embodiment, the light-emitting elements 214-1 and 214-2 may be attached adjacent to a frame of the electronic device 201. In an embodiment, the light-emitting elements 214-1 and 214-2 may be disposed adjacent to the one or more first cameras 211-1 and 211-2, and may assist the one or more first cameras 211-1 and 211-2 in gesture detection, head tracking, and space recognition when the electronic device 201 is used in a dark environment. In an embodiment, the light-emitting elements 214-1 and 214-2 may be disposed adjacent to the one or more third cameras 213, and may assist the one or more third cameras 213 in obtaining an image when the electronic device 201 is used in a dark environment.

In an embodiment, the electronic device 201 may include batteries 235-1 and 235-2. The batteries 235-1 and 235-2 may store power to operate the remaining components of the electronic device 201.

In an embodiment, the electronic device 201 may include a first display 251, a second display 252, one or more input optical members 253-1 and 253-2, and one or more transparent members 290-1 and 290-2, and one or more screen display portions 254-1 and 254-2.

In an embodiment, the first display 251 and the second display 252 may include, for example, a liquid crystal display (LCD), a digital mirror device (DMD), a silicon liquid crystal display (liquid crystal on silicon (LCoS)), an organic light-emitting diode (OLED), or a micro light-emitting diode (micro LED).

In an embodiment, when the first display 251 and the second display 252 may include one of the LCD, the DMD, or the LCOS, the electronic device 201 may include a light source configured to emit light to a screen display area of a display. In an embodiment, when the first display 251 and the second display 252 are capable of autonomously generating light (e.g., include one of the OLED or the micro LED), the electronic device 201 may provide a virtual image with a relatively good quality for the user even though not including a separate light source.

In an embodiment, the one or more transparent members 290-1 and 290-2 may be disposed to face the user's eyes when the user wears the electronic device 201. In an embodiment, the one or more transparent members 290-1 and 290-2 may include at least one of a glass plate, a plastic plate, or a polymer. In an embodiment, when wearing the electronic device 201, the user is able to see outside world through the one or more transparent members 290-1 and 290-2. In an embodiment, the one or more input optical members 253-1 and 253-2 may guide light generated by the first display 251 and the second display 252 to the user's eyes. In an embodiment, an image based on light generated by the first display 251 and the second display 252 may be formed on the one or more screen display portions 254-1 and 254-2 on the one or more transparent members 290-1 and 290-2, and the user may see the image formed on the one or more screen display portions 254-1 and 254-2.

In an embodiment, the electronic device 201 may include one or more optical waveguides (not shown). The optical waveguides may transmit light generated by the first display 251 and the second display 252 to the user's eyes. The electronic device 201 may include one optical waveguide corresponding to each of the left eye and the right eye. In an embodiment, the optical waveguides may include at least one of glass, plastic, or a polymer. In an embodiment, the optical waveguides may include a nanopattern disposed on one of internal or external surface, for example, a polygonal or curved grating structure. In an embodiment, the optical waveguides may include a free-form prism, in which case the optical waveguides may provide incident light to the user through a reflection mirror. In an embodiment, the optical waveguides may include at least one of at least one diffractive element (e.g., a diffractive optical element (DOE) and a holographic optical element (HOE)) or a reflective element (e.g., a reflection mirror), and may guide display light emitted from the light source to the user's eyes via the at least one diffractive element or the reflective element included in the optical waveguides. In an embodiment, the diffractive element may include an input/output optical member. In an embodiment, the reflective element may include a member that causes total reflection.

In an embodiment, the electronic device 201 may include one or more voice input devices 262-1, 262-2, and 262-3 and one or more voice output devices 263-1 and 263-2.

In an embodiment, the electronic device 201 may include a first PCB 270-1 and a second PCB 270-2. The first PCB 270-1 and the second PCB 270-2 may be configured to transmit an electrical signal to a component included in the electronic device 201, such as the one or more first cameras 211-1 and 211-2, the one or more second cameras 212-1 and 212-2, the one or more third cameras 213, the displays, an audio module, and a sensor. In an embodiment, the first PCB 270-1 and the second PCB 270-2 may include a flexible printed circuit board (FPCB). In an embodiment, the first PCB 270-1 and the second PCB 270-2 may each include a first substrate, a second substrate, and an interposer disposed between the first substrate and the second substrate.

Figure 3:
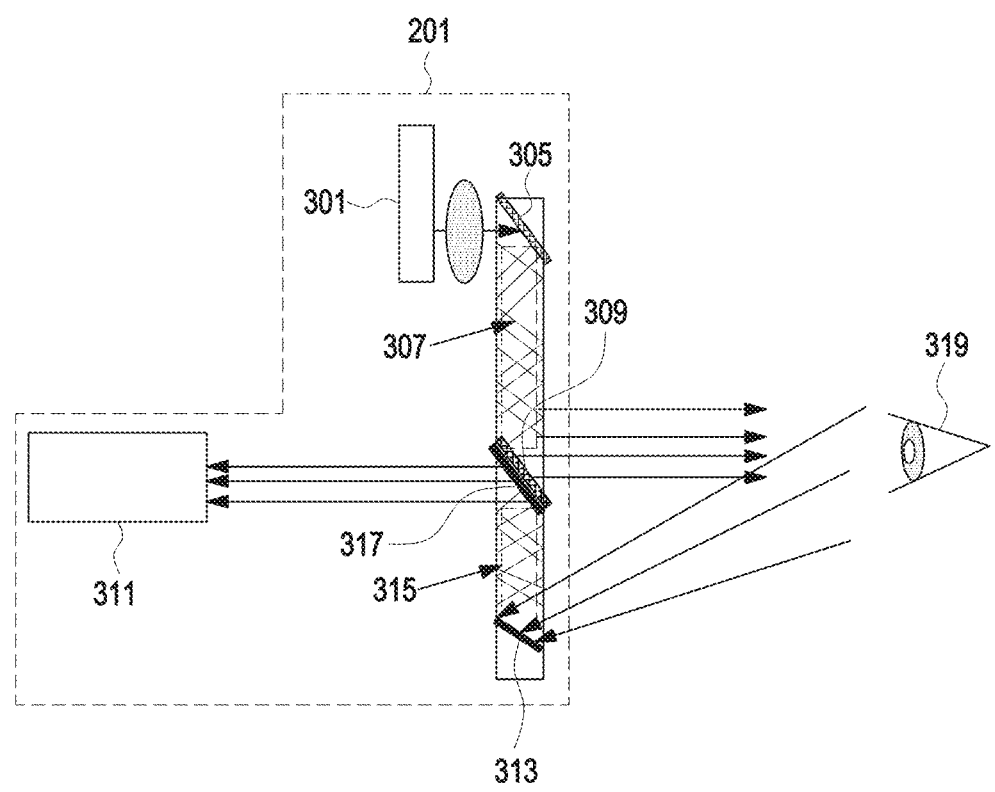
FIG. 3 is a diagram illustrating an example structure of an eye tracking camera of an electronic device according to various embodiments.

FIG. 3 diagram illustrating an example structure of an eye tracking camera of the electronic device 201 according to various embodiments.

Referring to FIG. 3, the electronic device 201 may include at least one of an eye tracking (ET) camera 311 (e.g., the one or more second cameras 212-1 and 212-2), a display 301, an input optical member 305, a first waveguide 307, an output optical member 309, a first splitter 313, a second waveguide 315, or a second splitter 317.

In an embodiment, a user's pupil 319 may be photographed by the ET camera 311 through the first splitter 313 (e.g., an eye tracking splitter), the second waveguide 315, and the second splitter 317. In an embodiment, the ET camera 311 may detect the pupil 319 in a captured image, and may identify the movement of the detected pupil 319, thereby tracking the user's gaze.

In an embodiment, the image output through the display 301 may be reflected through the input optical member 305 and the first waveguide 307 and displayed through the output optical member 309. In an embodiment, the electronic device 201 may output the image through the display 301, and may simultaneously identify the movement of the pupil 319 of the user, thereby tracking (e.g., identifying) the user's gaze (e.g., the direction of the user's gaze).

Figure 4:
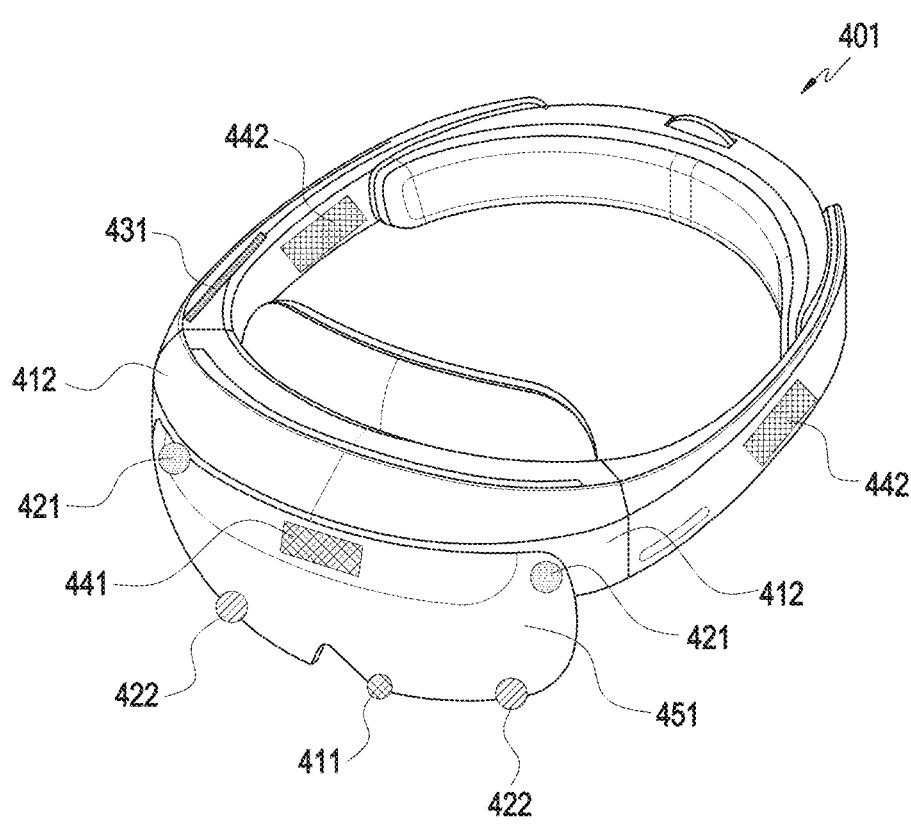
FIG. 4 is a perspective view illustrating an example electronic device according to various embodiments.

FIG. 4 is a perspective view illustrating an example electronic device 401 according to various embodiments.

Referring to FIG. 4, in an embodiment, the electronic device 401 (e.g., the electronic device 101 or the electronic device 201) may include a first microphone 411, a second microphone 412, a first camera 421, a second camera 422, a communication module (e.g., including communication circuitry) 431, a first speaker 441, a second speaker 442, and/or a display 451.

In an embodiment, the first microphone 411 may be configured to obtain a voice of a user wearing the electronic device 401 (hereinafter, referred to as a "user") from the user. The first microphone 411 may be disposed at a position on the electronic device 401 adjacent to the user's mouth to obtain the voice of the user.

In an embodiment, the second microphone 412 may obtain audio introduced from surroundings of the electronic device 401 (e.g., a voice of a counterpart and a sound from the surroundings of the electronic device 401). In an embodiment, the second microphone 412 may include a plurality of microphones. When the second microphone 412 includes the plurality of microphones, the electronic device 401 may determine the position of the counterpart, based on audio introduced through the plurality of microphones. In an embodiment, when the second microphone 412 includes the plurality of microphones, the electronic device 401 may strengthen audio (e.g., an audio signal corresponding to the voice of the counterpart) introduced in a specific direction (e.g., a direction from the position of the counterpart to the position of the electronic device 401) via beamforming through the plurality of microphones. In an embodiment, the second microphone 412 may perform a function the same as or similar to that of the one or more voice input devices 262-1, 262-2, and 262-3 included in the electronic device 201 of FIG. 2.

In an embodiment, the first camera 421 may sense a gesture of the user or a gesture of the counterpart. For example, the first camera 421 may consecutively obtain a plurality of frames including a gesture of the user (e.g., a hand gesture). The first camera 421 may transmit the plurality of obtained frames to a processor (e.g., a processor 570 of FIG. 5).

In an embodiment, the first camera 421 may sense a surrounding environment of the electronic device 401. For example, the first camera 421 may transmit an image of the surrounding environment of the electronic device 401 to the processor 570. When the counterpart is positioned in the surrounding environment of the electronic device 401, the processor 570 may detect the position of the counterpart, based on the image of the surrounding environment of the electronic device 401. The detected position of the counterpart may be used for beamforming of a plurality of microphones. In an embodiment, the first camera 421 may perform a function the same as or similar to that of the one or more first cameras (e.g., the first cameras 211-1 and 211-2 of FIG. 2) included in the electronic device 201 of FIG. 2.

In an embodiment, the second camera 422 may be configured to obtain an image of the face of the user. The second camera 422 may transmit an image of the face of the user to the processor 570. In an embodiment, the processor 570 may recognize the face of the user, based on the image of the face of the user. In an embodiment, processor 570 may detect a facial expression and/or a facial muscle movement of the user, based on the image of the face of the user.

In an embodiment, the communication module 431 (e.g., the communication module 190) may include various communication circuitry and establish communication between the electronic device 401 and an external electronic device (e.g., the electronic device 102, the electronic device 104, and/or a server (e.g., a cloud server or the server 108).

In an embodiment, the communication module 431 may enable the electronic device 401 to perform a call function. In an embodiment, the communication module 431 may transmit an audio signal related to a gesture of the user and/or a voice of the user to an electronic device of the counterpart while the user is performing a call with the counterpart. The communication module 431 may receive an audio signal related to a gesture of the counterpart and/or a voice of the counterpart from the electronic device of the counterpart while the user is performing a call with the counterpart.

In an embodiment, the communication module 431 may establish communication (e.g., establish wireless communication) between the electronic device 401 and an external input device for obtaining a gesture of the user (e.g., a finger movement of the user) and/or information related to health of the user. The external input device may include an input device using a vision method, a glove-type input device, and/or an arm band and a wrist band.

In an embodiment, the input device using the vision method may include an LED, and the electronic device 401 may obtain a hand movement of the user by sensing light emitted from the LED.

In an embodiment, the glove-type input device may include an inertial measurement unit (IMU) sensor and/or a metal member of which the resistance changes according to a change in tensile force to sense a hand movement of the user wearing the glove-type input device. The glove-type input device may transmit the sensed hand movement of the user to the electronic device 401.

In an embodiment, the arm band and the wrist band may be worn on an arm and a wrist of the user, respectively. The arm band and/or the wrist band may sense a finger movement by measuring an electrical signal of a neuron. For example, the arm band and/or the wrist band may sense a finger movement by measuring an electrical signal of a neuron through a plurality of electrodes included in the arm band and/or the wrist band. The arm band and/or wrist band may transmit the sensed finger movement to the electronic device 401.

In an embodiment, the arm band and/or the wrist band may obtain health information (e.g., heart rate and body fat percentage) about the user through a biometric sensor. The arm band and/or the wrist band may transmit the obtained health information to the electronic device 401.

However, the external input device for obtaining the gesture of the user and/or the information related to the health of the user is not limited to the input device using the vision method, the glove-type input device, and/or the arm band and the wrist band described above. In an embodiment, the external input device may include any input device capable of providing an input to the electronic device 401. For example, the external electronic device may include a keyboard and/or a mouse that is capable of establishing wired or wireless communication with the electronic device 401 and providing an input entered by the user to the electronic device 401.

In an embodiment, the first speaker 441 may output audio corresponding to a gesture of the user and/or audio corresponding to a voice of the user (voice made by the user). For example, when a gesture of the user is input to the electronic device 401 (e.g., when an image of a gesture of the user is obtained through the first camera 421), the first speaker 441 may output information (content) indicated by the gesture of the user in an audio form. In another example, when a voice of the user is input to the electronic device 401 (e.g., when a voice made by the user is obtained through the first microphone 411), the first speaker 441 may output information indicated by the voice of the user in an audio form. In an embodiment, the first speaker 441 may output the audio corresponding to the gesture of the user and/or the audio corresponding to the voice of the user, thereby delivering the intention of the user expressed through the output audio to the counterpart positioned near the user. In an embodiment, the first speaker 441 may be disposed at a position on the electronic device 401 adjacent to the user's mouth. In an embodiment, the first speaker 441 may be a mono speaker.

In an embodiment, the second speaker 442 may output audio corresponding to a gesture of the user and/or audio corresponding to a voice of the counterpart (voice made by the counterpart) (and an ambient sound). For example, when a gesture of the counterpart is input to the electronic device 401 (e.g., when an image of a gesture of the counterpart is obtained through the second camera 422), the second speaker 442 may output information (content) indicated by the gesture of the counterpart in an audio form. In another example, when a voice of the counterpart (or an ambient sound) is input to the electronic device 401 (e.g., when a voice made by the counterpart is obtained through the second microphone 412), the second speaker 442 may output information indicated by the voice of the counterpart in an audio form. In an embodiment, the second speaker 442 may output the audio corresponding to the gesture of the counterpart and/or the audio corresponding to the voice of the counterpart, thereby delivering the intention of the counterpart expressed through the output audio to the user. In an embodiment, the second speaker 442 may be disposed at a position on the electronic device 401 adjacent to an ear of the user. In an embodiment, the second speaker 442 may be a plurality of stereo speakers. In an embodiment, the second speaker 442 may perform a function the same as or similar to as that of the one or more voice output devices 263-1 and 263-2 included in the electronic device 201 of FIG. 2.

In an embodiment, the display 451 (e.g., the display module 160) (and an optical module) may be configured to provide a virtual image to the user and/or the counterpart.

In an embodiment, the display 451 may display a screen (hereinafter, referred to as an "internal screen") including content (e.g., text and/or an image) normally visible to the user through a transparent member and/or a screen (hereinafter, referred to as an "external screen") including voice content normally visible to the counterpart through the transparent member. For example, when content to be shown to the user is text "abcd", the display 451 may display an internal screen including the text "abcd" on the transparent member so that the text "abcd" is shown to the user. When the internal screen including the text "abcd" is displayed on the transparent member, text bilaterally symmetrical to the text "abcd" may be shown to the counterpart. When content to be shown to the counterpart is text "abcd", the display 451 may display an external screen including the text "abcd" on the transparent member so that the text "abcd" is shown to the counterpart. When the external screen including the text "abcd" is displayed on the transparent member, text bilaterally symmetrical to the text "abcd" may be shown to the user. In an embodiment, the display 451 may be disposed at a position in the electronic device 401 adjacent to the eyes of the user. In an embodiment, when the electronic device 401 includes an additional display in addition to the display 451, the processor may display the screen including the content (e.g., the text and/or the image) normally visible to the user through the transparent member on the display 451, and may display the screen including the voice content normally visible to the counterpart on the additional display.

Although FIG. 4 illustrates that the electronic device 401 includes the first microphone 411, the second microphone 412, the first camera 421, the second camera 422, the communication module 431, the first speaker 441, the second speaker 442, and the display 451, the electronic device 401 is not limited thereto. For example, the electronic device 401 may further include at least one of the components included in the electronic device 101 of FIG. 1 or the electronic device 201 of FIG. 2. In another example, according to an embodiment, the electronic device 401 may not include one or more of the first microphone 411, the second microphone 412, the first camera 421, the second camera 422, the communication module 431, the first speaker 441, the second speaker 442, and the display.

Figure 5:
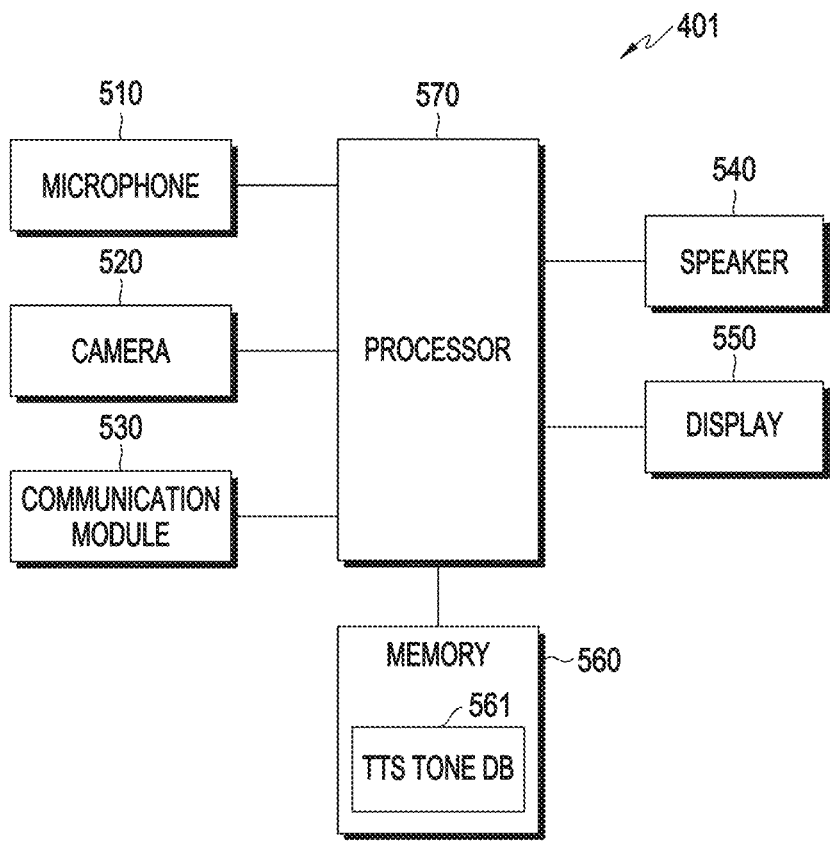
FIG. 5 is a block diagram illustrating an example configuration of an electronic device according to various embodiments.

FIG. 5 is a block diagram illustrating an example configuration of an electronic device 401 according to various embodiments.

Referring to FIG. 5, in an embodiment, the electronic device 401 may include a microphone 510, a camera 520, a communication module (e.g., including communication circuitry) 530, a speaker 540, a display 550, memory 560, and/or a processor (e.g., including processing circuitry) 570.

In an embodiment, the microphone 510 may include the first microphone 411 and/or the second microphone 412 of FIG. 4.

In an embodiment, the camera 520 may include the first camera 421 and/or the second camera 422 of FIG. 4.

The microphone 510 and the camera 520 configured to obtain audio and a gesture as inputs may be referred to as an "input module."

In an embodiment, the communication module 530 may include various communication circuitry and be included in the communication module 190 of FIG. 1, or may include the communication module 431 of FIG. 4.

In an embodiment, the speaker 540 may include the first speaker 441 and/or the second speaker 442 of FIG. 4.

In an embodiment, the display 550 may include the display 451 of FIG. 4.

In an embodiment, the memory 560 may be included in the memory 130 of FIG. 1.

In an embodiment, the memory 560 may store information for performing at least part of an operation of providing information. The information for performing the at least part of the operation of providing the information, which is stored in the memory 560, will be described in greater detail below.

In an embodiment, the memory 560 may include a text-to-speech (TTS) tone database (DB) 561 (also referred to as a "tone TTS model").

In an embodiment, the TTS tone DB 561 may include a unique characteristic (hereinafter, referred to as "tone") of audio to be applied to audio to be output from the electronic device 401.

In an embodiment, the electronic device 401 (e.g., the processor 570) may generate various tones to be applied to audio to be output from the electronic device 401, and may store the tones in the memory 560.

In an embodiment, the electronic device 401 may generate a tone corresponding to a person.

For example, the electronic device 401 may generate a tone corresponding to a user. The electronic device 401 may detect that the user is speaking, based on a face image of the user obtained by the second camera 422. When detecting that the user is speaking, the electronic device 401 may obtain a voice made by the user through the first microphone 411. The electronic device 401 may obtain (e.g., extract) a tone corresponding to the user, based on the obtained voice of the user. The electronic device 401 may store the obtained tone corresponding to the user in the memory 560. In an embodiment, when the tone corresponding to the user is generated, the electronic device 401 may map user information (e.g., information representing the user) and the tone corresponding to the user and store the same in the memory 560.

In another example, the electronic device 401 may generate a tone corresponding to a counterpart. The electronic device 401 may identify the counterpart, based on an image of the counterpart (e.g., the counterpart in a position adjacent to the user wearing the electronic device 401) obtained by the first camera 421. The electronic device 401 may obtain a voice made by the counterpart through the second microphone 412. The electronic device 401 may obtain (e.g., extract) a tone of the counterpart, based on the obtained voice of the counterpart. The electronic device 401 may store the obtained tone of the counterpart in the memory 560. In an embodiment, the electronic device 401 may identify the position of the counterpart, based on the image obtained by the first camera 421 and/or the voice obtained through the second microphone 412. When the position of the counterpart is identified, the electronic device 401 may strengthen the voice of the counterpart (e.g., an audio signal corresponding to the voice of the counterpart) introduced to the electronic device 401 from the counterpart via beamforming through the plurality of microphones included in the second microphone 412. In an embodiment, when the tone corresponding to the counterpart is generated, the electronic device 401 may map counterpart information (e.g., information representing the counterpart) and the tone corresponding to the counterpart and store the same in the memory 560.

In an embodiment, the electronic device 401 may generate a tone corresponding to an object capable of making a sound. For example, the electronic device 401 may identify an object (e.g., a pet or an object) that is making a sound (and the position of the object), based on an image obtained by the first camera 421. The electronic device 401 may obtain the sound made by the object through the first microphone 411. The electronic device 401 may obtain a tone corresponding to the object, based on the obtained sound. The electronic device 401 may store the obtained tone corresponding to the object in the memory 560. In an embodiment, when the tone corresponding to the object is generated, the electronic device 401 may map the object (e.g., information representing the object) and the tone corresponding to the object and store the same in the memory 560.

In an embodiment, at least part of an operation of the electronic device 401 generating a tone may be performed by an external electronic device (e.g., a server 108). In an embodiment, the electronic device 401 (or the server) may generate the tone corresponding to the user, the counterpart, and/or the object via a designated algorithm and/or artificial intelligence model.

In an embodiment, the electronic device 401 may receive a tone from the external electronic device through the communication module 530. The electronic device 401 may store the received tone in the memory 560.

In an embodiment, the processor 570 may be included in the processor 120 of FIG. 1.

In an embodiment, the processor 570 may include various processing circuitry and generally control the operation of providing information. In an embodiment, the processor 570 may include one or more processors to perform the operation of providing information. Various components included in the processor 570 to perform the operation of providing information will be described in greater detail below with reference to FIG. 6. The processor 570 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

In an embodiment, although FIG. 5 shows that the electronic device 401 includes the microphone 510, the camera 520, the communication module 530, the speaker 540, the display 550, the memory 560, and/or the processor 570, the electronic device 401 is not limited thereto. For example, the electronic device 401 may further include at least one of the components included in the electronic device 101 of FIG. 1 or the electronic device 201 of FIG. 2. In another example, according to an embodiment, the electronic device 401 may not include one or more of the microphone 510, the camera 520, the communication module 530, the speaker 540, the display 550, the memory 560, and/or the processor 570.

Figure 6:
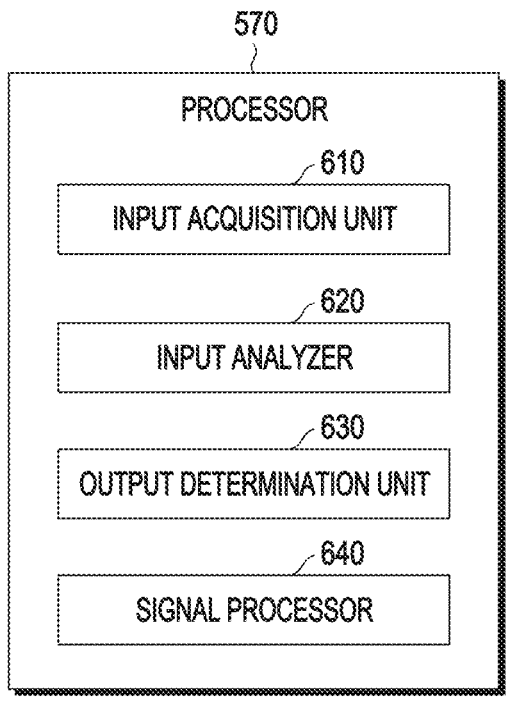
FIG. 6 is a block diagram illustrating an example configuration of a processor according to various embodiments.

FIG. 6 is a block diagram illustrating example configurations included in the processor 570 according to various embodiments.

Referring to FIG. 6, in an embodiment, the processor 570 may include an input acquisition unit 610, an input analyzer 620, an output determination unit 630, and/or a signal processor 640, each of which may include various processing circuitry and/or executable program instructions.

In an embodiment, the input acquisition unit 610 may obtain various inputs via an input module (e.g., the camera 520 and the microphone 510), the communication module 530, and/or an external input device.

In an embodiment, the input acquisition unit 610 may obtain, as inputs, a gesture of the user and/or a gesture of a counterpart through the first camera 421. For example, the input acquisition unit 610 may obtain an image of the gesture of the user (e.g., a hand movement of the user) and/or the gesture of the counterpart (e.g., a hand movement of the counterpart) through the first camera 421. In an embodiment, the gesture of the user and/or the gesture of the counterpart may include a hand movement of the user and/or the counterpart expressing sign language (also referred to as "finger language"). In an embodiment, the gesture of the user and/or the gesture of the counterpart may include a movement corresponding to specified content (or meaning).

In an embodiment, the input acquisition unit 610 may obtain a facial expression of the user as an input through the second camera 422. For example, the input acquisition unit 610 may obtain an image including the face of the user through the second camera 422.

In an embodiment, the input acquisition unit 610 may obtain, as inputs, a voice of the user input through the first microphone 411 and/or a voice of the counterpart input through the second microphone 412. In an embodiment, the input acquisition unit 610 may obtain, as an input, an ambient sound of the electronic device 401 input through the second microphone 412.

In an embodiment, the input acquisition unit 610 may obtain, as an input, an audio signal of the counterpart received through the communication module 530 while the user is performing a call with the counterpart.

In an embodiment, the input acquisition unit 610 may obtain, as an input, a gesture of the user (e.g., a hand movement of the user) obtained by sensing light emitted from an LED of an input device using a vision method.

In an embodiment, the input acquisition unit 610 may obtain, as an input, a gesture of the user (e.g., a hand movement of the user) received from a glove-type input device.

In an embodiment, the input acquisition unit 610 may obtain, as inputs, a hand movement of the user and/or health information received from an arm band and/or a wrist band.

However, an input obtainable by the input acquisition unit 610 is not limited to the foregoing inputs.

In an embodiment, the input analyzer 620 may identify the type of an input.

In an embodiment, the input analyzer 620 may identify that the type of an input obtained through the input acquisition unit 610 corresponds to at least one of a gesture, a voice (and/or an ambient sound), a facial expression of the user, and health information.

In an embodiment, the input analyzer 620 may identify whether an input gesture corresponds to a gesture of the user or a gesture of the counterpart by analyzing an image obtained by the first camera 421.

In an embodiment, the input analyzer 620 may identify whether an input voice is a voice made by the user or a voice made by the counterpart. For example, the input analyzer 620 may identify whether the input voice is the voice made by the user or the voice made by the counterpart by identifying a component (e.g., a device) that has obtained the voice. When the voice is obtained through the first microphone 411 (e.g., when the strength of an audio signal received through the first microphone 411 is greater than the strength of an audio signal received through the second microphone 412), the input analyzer 620 may identify that the input voice is the voice made by the user. When the voice is obtained through the second microphone 412 (e.g., when the strength of the audio signal received through the second microphone 412 is greater than the strength of an audio signal received through the first microphone 411), the input analyzer 620 may identify that the input voice is the voice made by the counterpart. In another example, the input analyzer 620 may identify whether the input voice is the voice made by the user or the voice made by the counterpart, based on the tone of the input voice. When the tone of the input voice corresponds to the user, the input analyzer 620 may identify that the input voice is the voice made by the user. When the tone of the input voice corresponds to the counterpart, the input analyzer 620 may identify that the input voice is the voice made by the counterpart.

In an embodiment, the input analyzer 620 may identify that an input is a facial expression of the user by analyzing an image obtained through the second camera 422.

In an embodiment, when health information is received from an external input device (e.g., the arm band and/or the wrist band), the input analyzer 620 may identify that an input is the health information.

In an embodiment, the input analyzer 620 may convert the input obtained through the input acquisition unit 610 into text.

In an embodiment, the input analyzer 620 may identify whether the input obtained through the input acquisition unit 610 is convertible into text. When the obtained input is convertible into text, the input analyzer 620 may convert information corresponding to the obtained input (e.g., information indicated by the obtained input) into text. For example, the input analyzer 620 may identify whether the input gesture (e.g., the gesture of the user and/or the gesture of the counterpart) corresponds to a sign language. The input analyzer 620 may identify whether the input gesture corresponds to the sign language by analyzing an image of the gesture obtained through the first camera 421. When the input gesture corresponds to the sign language, the input analyzer 620 may identify that the input gesture is convertible into text. The input analyzer 620 may convert the content of the sign language indicated by the input gesture into text. In another example, the input analyzer 620 may identify that the input gesture (e.g., the gesture of the user and/or the gesture of the counterpart) is a specified gesture (e.g., a gesture mapped to specified content and stored in the memory 560). The input analyzer 620 may identify whether the input gesture corresponds to the specified gesture by analyzing an image of the gesture obtained through the first camera 421. When the input gesture corresponds to the specified gesture, the input analyzer 620 may identify that the input gesture is convertible into text. The input analyzer 620 may convert the input gesture into text including information corresponding to the specified gesture. In still another example, the input analyzer 620 may identify whether the input facial expression of the user corresponds to a specified facial expression (e.g., a facial expression stored in the memory 560). The input analyzer 620 may identify the facial expression of the user by analyzing an image of the face of the user obtained through the second camera 422. When the facial expression of the user corresponds to the specified facial expression, the input analyzer 620 may identify that the input facial expression of the user is convertible into text. The input analyzer 620 may convert the input facial expression of the user into text including content representing the input facial expression of the user (or an emotion corresponding to the input facial expression of the user). In yet another example, the input analyzer 620 may identify whether the input voice of the user and/or voice of the counterpart is convertible into text. When the input voice of the user and/or voice of the counterpart is convertible into text, the input analyzer 620 may convert the input voice of the user and/or voice of the counterpart into text. For example, the input analyzer 620 may convert the input voice of the user and/or voice of the counterpart into text via a speech-to-text (STT) program. In still another example, the input analyzer 620 may identify whether the audio signal of the counterpart received through the communication module 530 while the user is performing a call with the counterpart is convertible into text. When the audio signal of the counterpart is convertible into text, the input analyzer 620 may convert the audio signal of the counterpart signal into text. In yet another example, the input analyzer 620 may identify whether the health information received from the external input device (e.g., the arm band and/or the wrist band) is convertible into text. When the health information is convertible into text, the input analyzer 620 may convert the health information into text.

In an embodiment, the output determination unit 630 may determine whether to output information corresponding to an input through one or more speakers. For example, the output determination unit 630 may determine whether to output the information corresponding to the input through the one or more speakers (e.g., the first speaker 441 and/or the second speaker 442) and/or whether to output the information corresponding to the input through the display 550.

In an embodiment, the output determination unit 630 may determine whether to output the information corresponding to the input through the speaker 540, based on a user input. For example, the output determination unit 630 may determine to output the information corresponding to the input through the speaker 540, based on a user input through a virtual keyboard displayed on the display 550. In another example, when an input voice of the user and/or gesture of the user correspond to a specified voice of the user and/or gesture of the user, the output determination unit 630 may determine to output the information corresponding to the input through the speaker 540.

In an embodiment, when determining not to output the information corresponding to the input through the speaker 540, the output determination unit 630 may determine whether to display the information corresponding to the input on the display 550.

In an embodiment, the output determination unit 630 may determine to output the information corresponding to the input via both the speaker 540 and the display 550.

In an embodiment, the output determination unit 630 may determine a component to output the information corresponding to the input, based on the type of the input.

In an embodiment, when the type of the input is the voice of the user, the output determination unit 630 may output information corresponding to the voice of the user through the first speaker 441. When the type of the input is the voice of the user, the output determination unit 630 may determine to display an internal screen including the information corresponding to the voice of the user (e.g., text corresponding to the voice of the user) on the display 550.

In an embodiment, when the type of the input is the voice of the user, the output determination unit 630 may determine to output the information corresponding to the voice of the user through the first speaker 441 and to display the internal screen including the information corresponding to the voice of the user (e.g., the text corresponding to the voice of the user) on the display 550 at the same time. When the type of the input is the voice of the counterpart, the output determination unit 630 may determine to output information corresponding to the voice of the counterpart through the second speaker 442 and to display an external screen including the information corresponding to the voice of the counterpart on the display 550 at the same time. However, the disclosure is not limited thereto. For example, when the type of the input is the voice of the user, the output determination unit 630 may determine to output the information corresponding to the voice of the user through the first speaker 441 and to display an external screen including the information corresponding to the voice of the user on the display 550 at the same time. In another example, when the type of the input is the voice of the counterpart, the output determination unit 630 may determine to output the voice of the counterpart through the second speaker 442 and to display an internal screen including the information corresponding to the voice of the counterpart on the display 550 at the same time.

In an embodiment, when the type of the input is the voice of the user or the voice of the counterpart, the output determination unit 630 may translate the information corresponding to the voice of the user or the voice of the counterpart into a language different from the language of the voice of the user or the voice of the counterpart. The output determination unit 630 may determine to display the information corresponding to the voice of the user or the voice of the counterpart translated into the different language on the display 550.

In an embodiment, when the type of the input is the gesture of the user, the output determination unit 630 may output information corresponding to the gesture of the user through the first speaker 441. When the type of the input is the gesture of the user, the output determination unit 630 may determine to display an external screen including the information corresponding to the gesture of the user (e.g., text indicating the information corresponding to the gesture of the user) on the display 550. When the type of the input is the gesture of the counterpart, the output determination unit 630 may output information corresponding to the gesture of the counterpart through the second speaker 442. When the type of the input is the gesture of the counterpart, the output determination unit 630 may determine to display an internal screen including the information corresponding to the gesture of the counterpart (e.g., text indicating the information corresponding to the gesture of the counterpart) on the display 550.

In an embodiment, when the type of the input is the gesture of the user, the output determination unit 630 may determine to output the information corresponding to the gesture of the user through the first speaker 441 and to display an external screen including the information corresponding to the gesture of the user (e.g., the text indicating the information corresponding to the gesture of the user) on the display 550 at the same time. When the type of the input is the gesture of the counterpart, the output determination unit 630 may determine to output the information corresponding to the gesture of the counterpart through the second speaker 442 and to display an internal screen including the information corresponding to the gesture of the counterpart (e.g., the text indicating the information corresponding to the gesture of the counterpart) on the display 550 at the same time.

In an embodiment, the output determination unit 630 may determine whether to output the information corresponding to the input through the speaker 540, based on a surrounding environment of the electronic device 401 (e.g., an ambient sound, brightness outside the electronic device 401, and the distance between the electronic device 401 and the counterpart).

In an embodiment, the output determination unit 630 may determine whether to output the input facial expression of the user (and/or the emotion of the user corresponding to the input facial expression of the user) and/or the health information through the speaker 540.

In an embodiment, the output determination unit 630 may obtain an emotion of the user or an emotion of the counterpart, based on the input voice of the user or voice of the counterpart. The output determination unit 630 may determine whether to output information indicating the emotion of the user or the emotion of the counterpart through the speaker 540.

In an embodiment, when a plurality of inputs is obtained, the output determination unit 630 may determine whether to output information corresponding to the plurality of inputs through the speaker 540. For example, when the plurality of inputs is obtained, the output determination unit 630 may determine whether to output the information corresponding to the plurality of inputs through the speaker 540 and/or the display 550, based on a user input or the type of the plurality of inputs.

In an embodiment, when the plurality of inputs is obtained, the output determination unit 630 may determine to output audio indicating the information corresponding to the plurality of inputs (e.g., audio into which text indicating information corresponding to each of the plurality of inputs is converted) through the speaker 540. For example, when a first input and a second input are obtained, the output determination unit 630 may determine to output first audio indicating information corresponding to the first input and second audio indicating information corresponding to the second input at the same time through the speaker 540. In an embodiment, when determining to output the audio indicating the information corresponding to the plurality of inputs through the speaker 540, the output determination unit 630 may enable the audio indicating the information corresponding to the plurality of inputs to have different tones. For example, when the gesture of the user and the gesture of the counterpart are input at the same time, the output determination unit 630 may determine to apply the tone of the user to audio indicating the information corresponding to the gesture of the user and to apply the tone of the counterpart to audio indicating the information corresponding to the gesture of the counterpart. However, the disclosure is not limited thereto. In an embodiment, the output determination unit 630 may enable the audio indicating the information corresponding to the plurality of inputs to have different levels (or volumes). For example, when the gesture of the user and the gesture of the counterpart are input at the same time, the output determination unit 630 may enable the audio indicating the information corresponding to the gesture of the user to have a first level and the audio indicating the information corresponding to the gesture of the counterpart to have a second level higher than the first level. In an embodiment, the output determination unit 630 may determine to sequentially output the audio indicating the information corresponding to the plurality of inputs. For example, when the gesture of the user and the gesture of the counterpart are input at the same time, the output determination unit 630 may determine to output the audio indicating the information corresponding to the gesture of the user and then consecutively output the audio indicating the information corresponding to the gesture of the counterpart.

In an embodiment, when the plurality of inputs is obtained, the output determination unit 630 may assign (or give) a priority to the plurality of inputs. For example, the output determination unit 630 may assign a higher priority to the gesture of the user than the gesture of the counterpart.

In an embodiment, the output determination unit 630 may determine the tone of the audio indicating the information corresponding to the plurality of inputs, the level of the audio, and/or the output order of the audio, based on the priorities of the plurality of inputs. For example, when the first input is assigned a higher priority than the second input, the output determination unit 630 may determine to output audio having a first tone for the first input and to output audio having a second tone for the second input. In another example, when the first input is assigned a higher priority than the second input, the output determination unit 630 may determine to output audio having a first level for the first input and to output audio having a second level, which is lower than the first level, for the second input. In another example, when the first input is assigned a higher priority than the second input, the output determination unit 630 may determine to output the audio indicating the information corresponding to the first input before the audio indicating the information corresponding to the second input.

In an embodiment, the output determination unit 630 may set the priorities assigned to the plurality of inputs, based on a user input. However, a method by which the output determination unit 630 sets the priorities for the plurality of inputs is not limited to the user input.

In an embodiment, when the plurality of inputs is obtained, the output determination unit 630 may determine to output the information corresponding to the plurality of inputs through the display 550. For example, when at least two inputs are obtained among a gesture of the user, a voice of the user, and health information about the user, the output determination unit 630 may determine to output the at least two obtained inputs through the display 550. The output determination unit 630 may determine to output texts (and/ or images) indicating information corresponding to the at least two inputs in different sizes, different colors, different text display areas on a transparent member, and/or different languages so that the texts are distinguished from each other. However, a method by which the output determination unit 630 outputs the texts indicating the information corresponding to the at least two obtained inputs to be distinguished from each other through the display 550 is not limited to the foregoing example.

In an embodiment, when the plurality of inputs is obtained, the output determination unit 630 may determine to output the information corresponding to the plurality of inputs through the display 550 and the speaker 540 via an avatar. For example, when the gesture of the user, the voice of the user, and the facial expression (and health information) of the user are input, the output determination unit 630 may control the display 550 so that an avatar corresponding to the user performs a movement corresponding to the gesture of the user and makes an expression corresponding to the facial expression of the user. The output determination unit 630 may determine to apply a tone corresponding to the avatar corresponding to the user to audio indicating information corresponding to the voice of the user.

In an embodiment, the output determination unit 630 may determine to transmit an audio signal related to the gesture of the user and/or the voice of the user to an electronic device of the counterpart while the user is performing a call with the counterpart. In an embodiment, the output determination unit 630 may determine whether to determine an audio signal related to the gesture of the counterpart and/or the voice of the counterpart through the speaker while the user is performing a call with the counterpart.

In an embodiment, the signal processor 640 may process information corresponding to an input, based on a determination of the output determination unit 630. For example, when the output determination unit 630 determines to output audio indicating the information corresponding to the input through the speaker, the signal processor 640 may convert text indicating the information corresponding to the input into audio via a text-to-speech (TTS) program. When the text indicating the information corresponding to the input is converted into the audio, the audio may be output through the speaker. In another example, when the output determination unit 630 determines to apply a first tone to the audio indicating the information corresponding to the input, the signal processor 640 may obtain the first tone from the TTS tone DB 561. The signal processor 640 may apply the first tone to the audio indicating the information corresponding to the input. In still another example, when the output determination unit 630 determines to simultaneously output information corresponding to a plurality of inputs through the speaker, the signal processor 640 may mix the audio indicating the information corresponding to the plurality of inputs, thereby outputting the audio indicating the information corresponding to the plurality of inputs at the same time. However, the disclosure is not limited to this example, and the signal processor 640 may perform a signal processing operation according to a determination of the output determination unit 630.

An electronic device according to various example embodiments of the disclosure may include: one or more input modules including input circuitry (e.g., the microphone 510 and the camera 520), one or more speakers (e.g., the speaker 540), a display (e.g., the display 550), at least one processor comprising processing circuitry (e.g., the processor 570), and memory storing instructions that, when executed by at least one processor individually or collectively, cause the electronic device: obtain an input through the one or more input modules (e.g., the microphone 510 and the camera 520), identify a type of the input, determine whether to output information corresponding to the input through the one or more speakers (e.g., the speaker 540), and control the one or more speakers so that the information corresponding to the input is output based on the type of the input through the one or more speakers (e.g., the speaker 540), based on determining to output the information corresponding to the input through the one or more speakers (e.g., the speaker 540).

In various example embodiments, the instructions, when executed by at least one processor individually or collectively, may further cause the electronic device to convert the obtained input into text.

In various example embodiments, the instructions, when executed by at least one processor individually or collectively, may cause the electronic device to determine whether to output the information corresponding to the input through the one or more speakers (e.g., the speaker 540), based on at least one of a user input or the type of the input.

In various example embodiments, the instructions, when executed by at least one processor individually or collectively, may cause the electronic device to determine a tone to be applied to audio indicating the information corresponding to the input.

In various example embodiments, the instructions, when executed by at least one processor individually or collectively, may cause the electronic device to: obtain a plurality of inputs through the one or more input modules (e.g., the microphone 510 and the camera 520) and determine different tones to be applied to audios that indicate information corresponding to the plurality of inputs and are to be simultaneously output, based on a type of the plurality of inputs.

In various example embodiments, the instructions, when executed by at least one processor individually or collectively, may cause the electronic device to determine to output information corresponding to a gesture and/or a voice of a user of the electronic device through a first speaker among the one or more speakers based on the type of the input being the gesture and/or the voice of the user, and determine to output information corresponding to a gesture and/or a voice of a counterpart through a second speaker among the one or more speakers based on the type of the input being the gesture and/or the voice of the counterpart.

In various example embodiments, the instructions, when executed by at least one processor individually or collectively, may cause the electronic device to: obtain a gesture input of a user of the electronic device and a voice input of the user through the one or more input modules (e.g., the microphone 510 and the camera 520), and determine a first tone to be applied to first audio indicating information corresponding to the gesture input of the user and a second tone to be applied to second audio that indicates information corresponding to the voice input of the user and is to be output simultaneously with the first audio.

In various example embodiments, the instructions, when executed by at least one processor individually or collectively, may cause the electronic device to: determine to display information corresponding to a gesture and/or a voice of a user of the electronic device on an external screen of the display (e.g., the display 550) based on the type of the input being the gesture and/or the voice of the user, and determine to output information corresponding to a gesture and/or a voice of a counterpart on an internal screen of the display (e.g., the display 550) based on the type of the input being the gesture and/or the voice of the counterpart.

In various example embodiments, the electronic device may further include: a communication module (e.g., the communication module 530), comprising communication circuitry, wherein the instructions, when executed by at least one processor individually or collectively, may further cause the electronic device to: transmit information corresponding to a gesture of a user of the electronic device to an external electronic device through the communication module (e.g., the communication module 530) based on receiving the gesture of the user while the electronic device performs a call with the external electronic device.

In various example embodiments, the instructions, when executed by at least one processor individually or collectively, may further cause the electronic device to: obtain information about a surrounding environment of the electronic device, and determine whether to output the information corresponding to the input through the one or more speakers (e.g., the speaker 540), based on the information about the surrounding environment of the electronic device.

Figure 7:
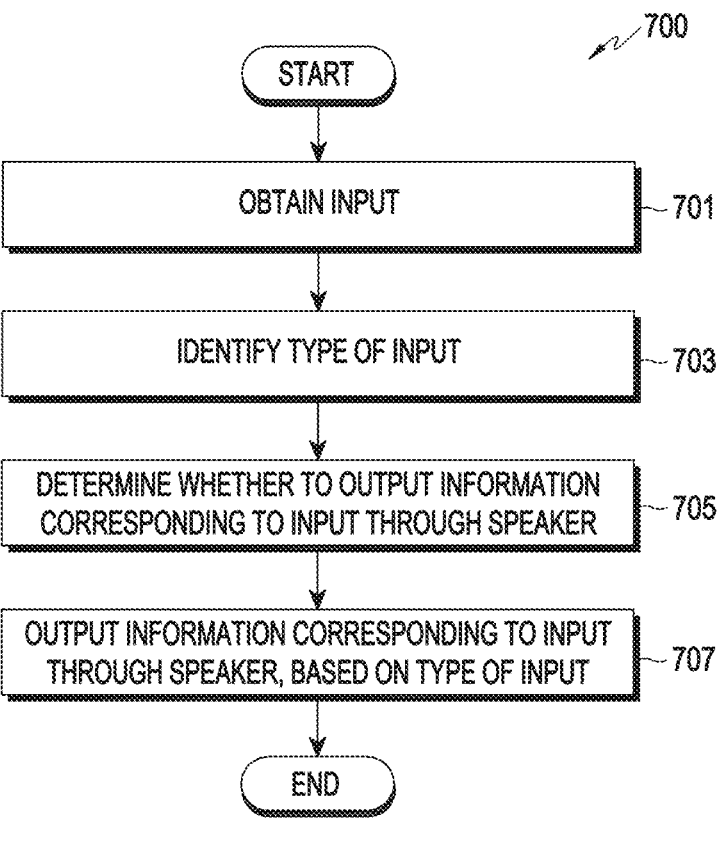
FIG. 7 is a flowchart illustrating an example method of providing information according to various embodiments.

FIG. 7 is a flowchart 700 illustrating an example method of providing information according to various embodiments.

Referring to FIG. 7, in operation 701, in an embodiment, the processor 570 may obtain an input through one or more input modules.

In an embodiment, the processor 570 may obtain, as inputs, a gesture of a user and/or a gesture of a counterpart through the first camera 421. For example, the processor 570 may obtain an image of the gesture of the user (e.g., a hand movement of the user) and/or the gesture of the counterpart (e.g., a hand movement of the counterpart) through the first camera 421. In an embodiment, the gesture of the user and/or the gesture of the counterpart may include a hand movement of the user and/or the counterpart expressing sign language (also referred to as "finger language"). In an embodiment, the gesture of the user and/or the gesture of the counterpart may include a movement corresponding to specified content (or meaning).

In an embodiment, the processor 570 may obtain a facial expression of the user as an input through the second camera 422. For example, the processor 570 may obtain an image including the face of the user through the second camera 422.

In an embodiment, the processor 570 may obtain, as inputs, a voice of the user input through the first microphone 411 and/or a voice of the counterpart input through the second microphone 412. In an embodiment, the processor 570 may obtain, as an input, an ambient sound of the electronic device 401 input through the second microphone 412.

In an embodiment, the processor 570 may obtain an input through the communication module 530. For example, the processor 570 may obtain, as an input, an audio signal of the counterpart received through the communication module 530 while the user is performing a call with the counterpart.

In an embodiment, the processor 570 may obtain an input via an external input device. For example, the processor 570 may obtain, as an input, a gesture of the user (e.g., a hand movement of the user) obtained by sensing light emitted from an LED of an input device using a vision method. In another example, the processor 570 may obtain, as an input, a gesture of the user (e.g., a hand movement of the user) received from a glove-type input device. In still another example, the processor 570 may obtain, as inputs, a hand movement of the user and/or health information received from an arm band and/or a wrist band.

However, an input obtainable by the processor 570 is not limited to the foregoing example inputs.

In operation 703, in an embodiment, the processor 570 may determine the type of the input.

In an embodiment, the processor 570 may identify that the type of the input obtained in operation 701 corresponds to at least one of a gesture, a voice (and/or an ambient sound), a facial expression of the user, and health information.

In an embodiment, the processor 570 may identify whether an input gesture corresponds to a gesture of the user or a gesture of the counterpart by analyzing an image obtained by the first camera 421.

In an embodiment, the processor 570 may identify whether an input voice is a voice made by the user or a voice made by the counterpart. For example, the processor 570 may identify whether the input voice is the voice made by the user or the voice made by the counterpart by identifying a component (e.g., a device) that has obtained the voice. When the voice is obtained through the first microphone 411, the processor 570 may identify that the input voice is the voice made by the user. When the voice is obtained through the second microphone 412, the processor 570 may identify that the input voice is the voice made by the counterpart. In another example, the processor 570 may identify whether the input voice is the voice made by the user or the voice made by the counterpart, based on the tone of the input voice. When the tone of the input voice corresponds to the user, the processor 570 may identify that the input voice is the voice made by the user. When the tone of the input voice corresponds to the counterpart, the processor 570 may identify that the input voice is the voice made by the counterpart.

In an embodiment, the processor 570 may identify that the input is a facial expression of the user by analyzing an image obtained through the second camera 422.

In an embodiment, when health information is received from the external input device (e.g., the arm band and/or the wrist band), the processor 570 may identify that the input is the health information.

In an embodiment, the processor 570 may convert the obtained input into text.

In an embodiment, the processor 570 may identify whether the obtained input is convertible into text. When the obtained input is convertible into text, the processor 570 may convert information corresponding to the obtained input (e.g., information indicated by the obtained input) into text. For example, the processor 570 may identify whether the input gesture (e.g., the gesture of the user and/or the gesture of the counterpart) corresponds to a sign language. The processor 570 may identify whether the input gesture corresponds to the sign language by analyzing an image of the gesture obtained through the first camera 421. When the input gesture corresponds to the sign language, the processor 570 may identify that the input gesture is convertible into text. The processor 570 may convert the content of the sign language indicated by the input gesture into text. In another example, the processor 570 may identify that the input gesture (e.g., the gesture of the user and/or the gesture of the counterpart) is a specified gesture (e.g., a gesture mapped to specified content and stored in the memory 560). The processor 570 may identify whether the input gesture corresponds to the specified gesture by analyzing the image of the gesture obtained through the first camera 421. When the input gesture corresponds to the specified gesture, the processor 570 may identify that the input gesture is convertible into text. The processor 570 may convert the input gesture into text including information corresponding to the specified gesture. In still another example, the processor 570 may identify whether the input facial expression of the user corresponds to a specified facial expression (e.g., a facial expression stored in the memory 560). The processor 570 may identify the facial expression of the user by analyzing an image of the face of the user obtained through the second camera 422. When the facial expression of the user corresponds to the specified facial expression, the processor 570 may identify that the input facial expression of the user is convertible into text. The processor 570 may convert the input facial expression of the user into text including content representing the input facial expression of the user (or an emotion corresponding to the input facial expression of the user). In yet another example, the processor 570 may identify whether the input voice of the user and/or voice of the counterpart is convertible into text. When the input voice of the user and/or voice of the counterpart is convertible into text, the processor 570 may convert the input voice of the user and/or voice of the counterpart into text. For example, the processor 570 may convert the input voice of the user and/or voice of the counterpart into text via an STT program. In still another example, the processor 570 may identify whether the audio signal of the counterpart received through the communication module 530 while the user is performing a call with the counterpart is convertible into text. When the audio signal of the counterpart is convertible into text, the processor 570 may convert the audio signal of the counterpart signal into text. In yet another example, the processor 570 may identify whether the health information received from the external input device (e.g., the arm band and/or the wrist band) is convertible into text. When the health information is convertible into text, the processor 570 may convert the health information into text.

In operation 705, in an embodiment, the processor 570 may determine whether to output information corresponding to the input through the speaker 540. For example, the processor 570 may determine whether to output the information corresponding to the input through one or more speakers (e.g., the first speaker 441 and/or the second speaker 442) and/or whether to output the information corresponding to the input through the display 550.

In an embodiment, the processor 570 may determine whether to output the information corresponding to the input through the speaker 540, based on a user input. For example, the processor 570 may determine to output the information corresponding to the input through the speaker 540, based on a user input through a virtual keyboard displayed on the display 550. In another example, when the input voice of the user and/or gesture of the user correspond to a specified voice of the user and/or gesture of the user, the processor 570 may determine to output the information corresponding to the input through the speaker 540.

In an embodiment, when determining not to output the information corresponding to the input through the speaker 540, the processor 570 may determine whether to display the information corresponding to the input on the display 550.

In an embodiment, the processor 570 may determine to output the information corresponding to the input via both the speaker 540 and the display 550.

In an embodiment, the processor 570 may determine whether to output the information corresponding to the input through the speaker 540, based on the type of the input.

In an embodiment, the processor 570 may determine whether to output the information corresponding to the input through the speaker 540, based on a user input and/or the type of the input.

In an embodiment, the processor 570 may determine a component to output the information corresponding to the input, based on the type of the input. In an embodiment, when the type of the input is the voice of the user, the processor 570 may output information corresponding to the voice of the user through the first speaker 441. When the type of the input is the voice of the user, the processor 570 may determine to display an internal screen including the information corresponding to the voice of the user (e.g., text corresponding to the voice of the user) on the display 550.

In an embodiment, when the type of the input is the voice of the user, the processor 570 may determine to output the information corresponding to the voice of the user through the first speaker 441 and to display the internal screen including the information corresponding to the voice of the user (e.g., the text corresponding to the voice of the user) on the display 550 at the same time. When the type of the input is the voice of the counterpart, the processor 570 may determine to output information corresponding to the voice of the counterpart through the second speaker 442 and to display an external screen including the information corresponding to the voice of the counterpart on the display 550 at the same time. However, the disclosure is not limited thereto. For example, when the type of the input is the voice of the user, the processor 570 may determine to output the information corresponding to the voice of the user through the first speaker 441 and to display an external screen including the information corresponding to the voice of the user on the display 550 at the same time. In another example, when the type of the input is the voice of the counterpart, the processor 570 may determine to output the voice of the counterpart through the second speaker 442 and to display an internal screen including the information corresponding to the voice of the counterpart on the display 550 at the same time.

In an embodiment, when the type of the input is the voice of the user or the voice of the counterpart, the processor 570 may translate the information corresponding to the voice of the user or the voice of the counterpart into a language different from the language of the voice of the user or the voice of the counterpart. The processor 570 may determine to display the information corresponding to the voice of the user or the voice of the counterpart translated into the different language on the display 550.

In an embodiment, when the type of the input is the gesture of the user, the processor 570 may output information corresponding to the gesture of the user through the first speaker 441. When the type of the input is the gesture of the user, the processor 570 may determine to display an external screen including the information corresponding to the gesture of the user (e.g., text indicating the information corresponding to the gesture of the user) on the display 550. When the type of the input is the gesture of the counterpart, the processor 570 may output information corresponding to the gesture of the counterpart through the second speaker 442. When the type of the input is the gesture of the counterpart, the processor 570 may determine to display an internal screen including the information corresponding to the gesture of the counterpart (e.g., text indicating the information corresponding to the gesture of the counterpart) on the display 550.

In an embodiment, when the type of the input is the gesture of the user, the processor 570 may determine to output the information corresponding to the gesture of the user through the first speaker 441 and to display an external screen including the information corresponding to the gesture of the user (e.g., the text indicating the information corresponding to the gesture of the user) on the display 550 at the same time. When the type of the input is the gesture of the counterpart, the processor 570 may determine to output the information corresponding to the gesture of the counterpart through the second speaker 442 and to display an internal screen including the information corresponding to the gesture of the counterpart (e.g., the text indicating the information corresponding to the gesture of the counterpart) on the display 550 at the same time.

In an embodiment, the processor 570 may determine whether to output the information corresponding to the input through the speaker, based on a surrounding environment of the electronic device 401 (e.g., an ambient sound, brightness outside the electronic device 401 (e.g., the intensity of light entering the electronic device 401), and the distance between the electronic device 401 and the counterpart).

In an embodiment, the processor 570 may determine whether to output the input facial expression of the user (and/or the emotion of the user corresponding to the input facial expression of the user) and/or the health information through the speaker 540.

In an embodiment, the processor 570 may obtain an emotion of the user or an emotion of the counterpart, based on the input voice of the user or voice of the counterpart. The processor 570 may determine whether to output information indicating the emotion of the user or the emotion of the counterpart through the speaker 540.

In an embodiment, when a plurality of inputs is obtained, the processor 570 may determine whether to output information corresponding to the plurality of inputs through the speaker 540. For example, when the plurality of inputs is obtained, the processor 570 may determine whether to output the information corresponding to the plurality of inputs through the speaker 540 and/or the display 550, based on a user input or the type of the plurality of inputs.

In an embodiment, when the plurality of inputs is obtained, the processor 570 may determine to output the information corresponding to the plurality of inputs (e.g., audio into which text indicating information corresponding to each of the plurality of inputs is converted) through the speaker 540. For example, when a first input and a second input are obtained, the processor 570 may determine to output first audio indicating information corresponding to the first input and second audio indicating information corresponding to the second input at the same time through the speaker 540. In an embodiment, when determining to output the information corresponding to the plurality of inputs through the speaker 540, the processor 570 may enable audio indicating the information corresponding to the plurality of inputs to have different tones. For example, when the gesture of the user and the gesture of the counterpart are input at the same time, the processor 570 may determine to apply the tone of the user to audio indicating the information corresponding to the gesture of the user and to apply the tone of the counterpart to audio indicating the information corresponding to the gesture of the counterpart. However, the disclosure is not limited thereto. In an embodiment, the processor 570 may enable the audio indicating the information corresponding to the plurality of inputs to have different levels (or volumes). For example, when the gesture of the user and the gesture of the counterpart are input at the same time, the processor 570 may enable the audio indicating the information corresponding to the gesture of the user to have a first level and the audio indicating the information corresponding to the gesture of the counterpart to have a second level higher than the first level. In an embodiment, the processor 570 may determine to sequentially output the audio indicating the information corresponding to the plurality of inputs. For example, when the gesture of the user and the gesture of the counterpart are input at the same time, the processor 570 may determine to output the audio indicating the information corresponding to the gesture of the user and then consecutively output the audio indicating the information corresponding to the gesture of the counterpart.

In an embodiment, when the plurality of inputs is obtained, the processor 570 may assign a priority to the plurality of inputs. For example, the processor 570 may assign a higher priority to the gesture of the user than the gesture of the user.

In an embodiment, the processor 570 may determine the tone of the audio indicating the information corresponding to the plurality of inputs, the level of the audio, and/or the output order of the audio, based on the priorities of the plurality of inputs. For example, when the first input is assigned a higher priority than the second input, the processor 570 may determine to output audio having a first tone for the first input and to output audio having a second tone for the second input. In another example, when the first input is assigned a higher priority than the second input, the processor 570 may determine to output audio having a first level for the first input and to output audio having a second level, which is lower than the first level, for the second input. In another example, when the first input is assigned a higher priority than the second input, the processor 570 may determine to output the audio indicating the information corresponding to the first input before the audio indicating the information corresponding to the second input.

In an embodiment, the processor 570 may set the priorities assigned to the plurality of inputs, based on a user input (e.g., a user input through a virtual keyboard). However, a method by which the processor 570 sets the priorities for the plurality of inputs is not limited to the user input.

In an embodiment, when the plurality of inputs is obtained, the processor 570 may determine to output the information corresponding to the plurality of inputs through the display 550. For example, when at least two inputs are obtained among a gesture of the user, a voice of the user, a user input through a virtual keyboard, and health information about the user, the processor 570 may determine to output the at least two obtained inputs through the display 550. The processor 570 may determine to output texts (and/or images) indicating information corresponding to the at least two inputs in different sizes, different colors, different areas on a transparent member on which the texts are displayed, and/or different languages so that the texts are distinguished from each other. However, a method by which the processor 570 outputs the texts indicating the information corresponding to the at least two obtained inputs to be distinguished from each other through the display 550 is not limited to the foregoing example.

In an embodiment, when the plurality of inputs is obtained, the processor 570 may determine to output the information corresponding to the plurality of inputs through the display 550 and the speaker 540 via an avatar. For example, when the gesture of the user, the voice of the user, and the facial expression (and health information) of the user are input, the processor 570 may control the display 550 so that an avatar corresponding to the user performs a movement corresponding to the gesture of the user and makes an expression corresponding to the facial expression of the user. The processor 570 may determine to apply a tone of the avatar corresponding to the user to audio indicating information corresponding to the voice of the user.

In an embodiment, the processor 570 may determine to transmit an audio signal related to the gesture of the user and/or the voice of the user to an electronic device of the counterpart while the user is performing a call with the counterpart. In an embodiment, the processor 570 may determine whether to determine an audio signal related to the gesture of the counterpart and/or the voice of the counterpart through the speaker 540 while the user is performing a call with the counterpart.

In operation 707, in an embodiment, the processor 570 may output the information corresponding to the input through the speaker 540, based on the type of the input. For example, the processor 570 may output the information corresponding to the input through the speaker 540, based on determining to output the information corresponding to the input through the speaker 540.

In an embodiment, the processor 570 may process the information corresponding to the input. For example, when determining to output audio indicating the information corresponding to the input through the speaker, the processor 570 may convert text indicating the information corresponding to the input into audio via a TTS program. After converting the text indicating the information corresponding to the input into the audio, the processor 570 may output the converted audio through the speaker 540. In another example, when determining to apply a first tone to the audio indicating the information corresponding to the input, the processor 570 may obtain the first tone from the TTS tone DB 561. The processor 570 may apply the first tone to the audio indicating the information corresponding to the input. In still another example, when the output determination unit determines to simultaneously output the information corresponding to the plurality of inputs through the speaker 540, the processor 570 may mix the audio indicating the information corresponding to the plurality of inputs, thereby outputting the audio indicating the information corresponding to the plurality of inputs at the same time. However, the disclosure is not limited to this example.

Although FIG. 7 illustrates that operation 705 of determining whether to output the information corresponding to the input through the speaker 540 is performed after operation 701 and operation 703 are performed, the disclosure is not limited thereto. In an embodiment, the processor 570 may determine whether to output an input to be obtained through one or more input modules through the speaker 540 (and/or through the display 550) before performing operation 701 and/or operation 703. For example, the processor 570 may determine whether to output the input to be obtained through the one or more input modules through the speaker 540 (and/or through the display 550), based on a user input and/or a setting of the electronic device 401, before performing operation 701 and/or operation 703.

Figure 8:
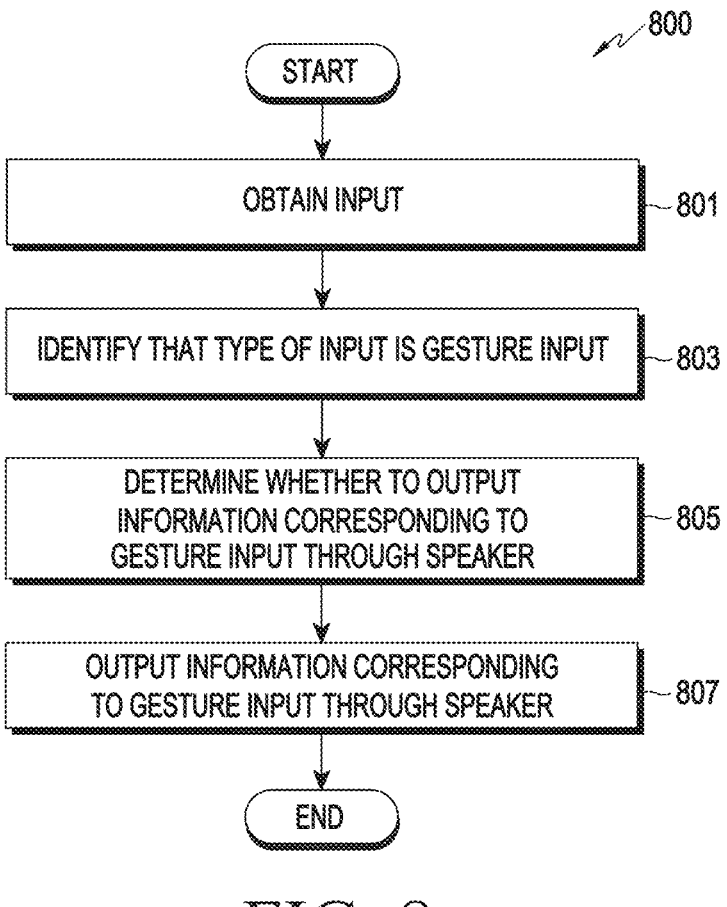
FIG. 8 is a flowchart illustrating an example method of providing information corresponding to a gesture according to various embodiments.

FIG. 8 is a flowchart 800 illustrating an example method of providing information corresponding to a gesture according to various embodiments.

Referring to FIG. 8, in operation 801, in an embodiment, the processor 570 may obtain an input through one or more input modules. For example, the processor 570 may obtain a gesture input related to a gesture of a user and/or a gesture of a counterpart through the one or more input modules (e.g., the first camera 421). In another example, the processor 570 may obtain a gesture input related to a gesture of the user via an external input device (e.g., an input device using a vision method, a glove-type input device, or an arm band and/or a wrist band).

In operation 803, in an embodiment, the processor 570 may identify that the type of the input is a gesture input. For example, the processor 570 may identify that the type of the input is the gesture input related to the gesture of the user and/or the gesture of the counterpart.

In an embodiment, the processor 570 may determine whether the input gesture corresponds to one of the gesture of the user and the gesture of the counterpart by analyzing an image obtained by the first camera 421.

In an embodiment, the processor 570 may identify that the type of the input is the gesture input of the user by analyzing information received from the external input device (e.g., the input device using the vision method, the glove-type input device, or the arm band and/or wrist band) through the communication module 530

In an embodiment, the processor 570 may convert the gesture input to text. In an embodiment, the processor 570 may identify whether the gesture input is convertible into text. For example, when the gesture input (e.g., the gesture input of the user and/or the gesture input of the counterpart) corresponds to a sign language, the processor 570 may identify that the gesture input is convertible into text. When identifying that the gesture input is convertible into text, the processor 570 may convert the gesture input (e.g., content of the sign language) into text. In another example, when the gesture input (e.g., the gesture input of the user and/or the gesture input of the counterpart) corresponds to a specified gesture input, the processor 570 may identify that the gesture input is convertible into text. When identifying that the gesture input is convertible into text, the processor 570 may convert the gesture input (e.g., information corresponding to a specified gesture) into text.

In operation 805, in an embodiment, the processor 570 may determine whether to output information corresponding to the gesture input through the speaker 540. For example, the processor 570 may determine whether to output the information corresponding to the gesture input through one or more speakers (e.g., the first speaker 441 and the second speaker 442) and/or the display 550.

In an embodiment, the processor 570 may determine to output audio indicating information corresponding to the gesture of the user through the second speaker 442, based on a setting. For example, the user may configure a configuration (or "mode") (hereinafter, referred to as a "first setting") enabling the audio indicating the information corresponding to the gesture of the user to be output through the second speaker 442 in order to listen to the audio indicating the information corresponding to the gesture of the user.

In an embodiment, when the first setting is set and the type of the input is identified as the gesture input of the user, the processor 570 may determine to apply a tone of the user (or a tone specified by the user) to the audio indicating the information corresponding to the gesture of the user.

In an embodiment, when the first setting is set and a facial expression of the user is input through the second camera 422 in addition to the gesture input of the user, the processor 570 may determine to apply the tone of the user and/or a tone corresponding to the facial expression of the user (or an emotion corresponding to the facial expression of the user) to the audio indicating the information corresponding to the gesture of the user.

In an embodiment, when the first setting is set and health information (e.g., heart rate, body fat percentage, and an electrical signal of a neuron) about the user is received from the external input device (e.g., the arm band and/or wrist band) in addition to the gesture input of the user, the processor 570 may determine to apply the tone of the user and/or a tone corresponding to the health information about the user to the audio indicating the information corresponding to the gesture of the user.

In an embodiment, when the first setting is set, the facial expression of the user is input through the second camera

422, and the health information about the user is received from the external input device (e.g., the arm band and/or wrist band) in addition to the gesture input of the user, the processor 570 may determine to apply the tone of the user, the tone corresponding to the facial expression of the user, and/or the tone corresponding to the health information about the user to the audio indicating the information corresponding to the gesture of the user.

In an embodiment, the processor 570 may determine to output the audio indicating the information corresponding to the gesture of the user through the first speaker 441, based on a setting. For example, the user may set a setting (hereinafter, referred to as a "second setting") enabling the audio indicating the information corresponding to the gesture of the user to be output through the first speaker 441 so that the counterpart positioned adjacent to the electronic device 401 (or the user of the electronic device 401) listens to the audio indicating the information corresponding to the gesture of the user.

In an embodiment, when the second setting is set and the type of the input is identified as the gesture input of the user, the processor 570 may determine to apply a tone of the user (or a tone specified by the user) to the audio indicating the information corresponding to the gesture of the user.

In an embodiment, when the second setting is set and a facial expression of the user is input through the second camera 422 in addition to the gesture input of the user, the processor 570 may determine to apply the tone of the user and/or a tone corresponding to the facial expression of the user (or an emotion corresponding to the facial expression of the user) to the audio indicating the information corresponding to the gesture of the user.

In an embodiment, when the second setting is set and health information (e.g., heart rate, body fat percentage, and an electrical signal of a neuron) about the user is received from the external input device (e.g., the arm band and/or wrist band) in addition to the gesture input of the user, the processor 570 may determine to apply the tone of the user and/or a tone corresponding to the health information about the user to the audio indicating the information corresponding to the gesture of the user.

In an embodiment, when the second setting is set, the facial expression of the user is input through the second camera 422, and the health information about the user is received from the external input device (e.g., the arm band and/or wrist band) in addition to the gesture input of the user, the processor 570 may determine to apply the tone of the user, the tone corresponding to the facial expression of the user, and/or the tone corresponding to the health information about the user to the audio indicating the information corresponding to the gesture of the user.

In an embodiment, when the second setting is set, the processor 570 may determine a tone to be applied to the audio indicating the information corresponding to the gesture input of the user, based on counterpart information (e.g., the gender, age, and/or occupation of the counterpart). For example, when the second setting is set and the type of the input is the gesture input of the user, the processor 570 may determine to apply a tone of a cartoon character to the audio indicating the information corresponding to the gesture input of the user, based on the counterpart being an infant or child.

In an embodiment, when the second setting is set and the type of the input is the gesture input of the user, the processor 570 may determine the level of the audio indicating the information corresponding to the gesture input of the user, based on the distance between the electronic device 401 and the counterpart. For example, when the second setting is set and the type of the input is the gesture input of the user, the processor 570 may increase the level of the audio indicating the information corresponding to the gesture input of the user as the distance between the electronic device 401 and the counterpart increases.

In an embodiment, the processor 570 may determine to output audio indicating information corresponding to the gesture of the counterpart through the second speaker 442, based on a setting. For example, the user may set a setting (hereinafter, referred to as a "third setting") enabling the audio indicating the information corresponding to the gesture of the counterpart to be output through the second speaker 442 in order to listen to the audio indicating the information corresponding to the gesture of the counterpart.

In an embodiment, when the third setting is set and the type of the input is identified as the gesture input of the counterpart, the processor 570 may determine to apply a tone of the counterpart (or a tone specified by the user) to the audio indicating the information corresponding to the gesture of the counterpart. When information about the tone of the counterpart is not stored in the memory 560, the processor 570 may determine to apply the tone of the user (or the tone specified by the user) to the audio indicating the information corresponding to the gesture of the counterpart.

In an embodiment, the processor 570 may set the first setting, the second setting, and/or the third setting, based on a user input, the type of the input, and/or the presence of the counterpart (e.g., whether the counterpart is positioned adjacent to the electronic device 401). For example, when the counterpart is within a specified distance (e.g., about 2 m) from the electronic device 401, the processor 570 may set the second setting and the third setting. In another example, when the counterpart does not exist within the specified distance from the electronic device 401 (e.g., when the counterpart does not exist adjacent to the electronic device 401), the processor 570 may set the first setting. In another example, when the type of the input is the gesture input of the user and the counterpart exists within the specified distance from the electronic device 401, the processor 570 may set the second setting. In another example, when the type of the input is the gesture input of the counterpart and the counterpart exists within the specified distance from the electronic device 401, the processor 570 may set the third setting. In another example, when the type of the input is the gesture input of the user and the counterpart does not exist within the specified distance from the electronic device 401, the processor 570 may set the first setting.

In operation 807, in an embodiment, when determining to output the information corresponding to the gesture through the speaker 540, the processor 570 may output the information corresponding to the gesture through the speaker 540.

In an embodiment, when setting the first setting and determining to output the gesture input of the user through the second speaker 442, the processor 570 may output the audio indicating the information corresponding to the gesture of the user through the second speaker 442. When setting the second setting and determining to output the gesture input of the user through the first speaker 441, the processor 570 may output the audio indicating the information corresponding to the gesture of the user through the first speaker 441. When setting the third setting and determining to output the gesture input of the counterpart through the second speaker 442, the processor 570 may output the audio indicating the information corresponding to the gesture of the counterpart through the second speaker 442.

In an embodiment, the processor 570 may output audio corresponding to the gesture input and having a tone determined in operation 805 through the speaker. In an embodiment, the processor 570 may output the audio corresponding to the gesture input and having an audio level determined in operation 805 through the speaker.

Figure 9:
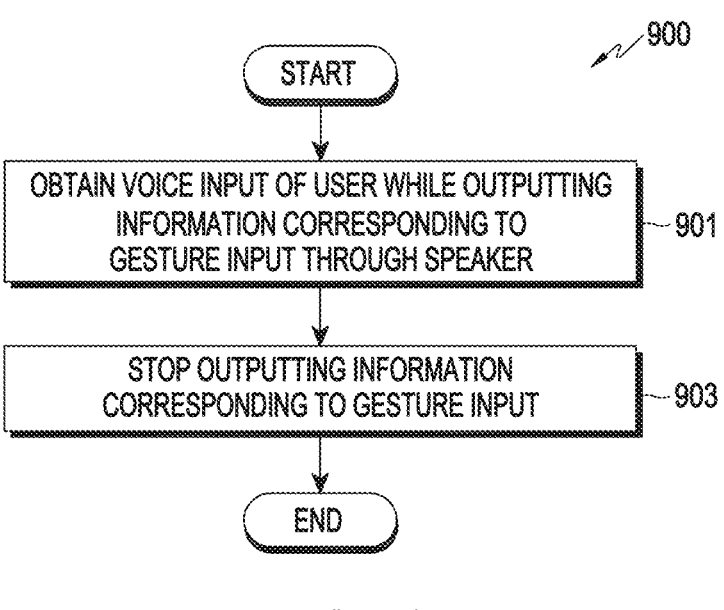
FIG. 9 is a flowchart illustrating an example method of providing information corresponding to a gesture according to various embodiments.

FIG. 9 is a flowchart 900 illustrating an example method of providing information corresponding to a gesture according to various embodiments.

In an embodiment, FIG. 9 may be a diagram illustrating an operation performed when a voice of a user is input while information corresponding to a gesture of the user is output through a speaker (e.g., the first speaker 441).

Referring to FIG. 9, in operation 901, in an embodiment, the processor 570 may obtain a voice input of the user while outputting information corresponding to a gesture input (e.g., audio indicating the information corresponding to the gesture input) through the speaker 540. For example, the processor 570 may obtain a voice input of the user through the first microphone 411 while outputting information corresponding to a gesture input of the user through the speaker 540. However, the disclosure is not limited thereto, and the processor 570 may identify that the user is making a voice, based on an image (e.g., an image of a facial muscle movement of the user) obtained by the second camera 422, while outputting the information corresponding to the gesture input of the user through the speaker 540.

In operation 903, in an embodiment, when obtaining the voice input of the user (or identifying that the user is making the voice, based on the image of the facial muscle movement of the user) while outputting the information corresponding to the gesture input through the speaker, the processor 570 may stop outputting the information corresponding to the gesture input through the speaker 540. For example, when obtaining the voice input of the user while outputting the information corresponding to the gesture input of the user through the first speaker 441, the processor 570 may stop outputting the information corresponding to the gesture input of the user through the first speaker 441 so that the voice made by the user is accurately transmitted to a counterpart. In another example, when the voice input of the user is obtained while outputting the information corresponding to the gesture input of the user through the first speaker 441 and the counterpart is positioned within a specified distance from the electronic device 401, the processor 570 may stop outputting the information corresponding to the gesture input of the user through the first speaker 441 so that the voice made by the user is accurately transmitted to the counterpart. In another example, when the voice input of the user is obtained while outputting the information corresponding to the gesture input of the user through the first speaker 441 and the counterpart does not exist within the specified distance from the electronic device 401, the processor 570 may not stop outputting the information corresponding to the gesture input of the user through the first speaker 441

Figure 10:
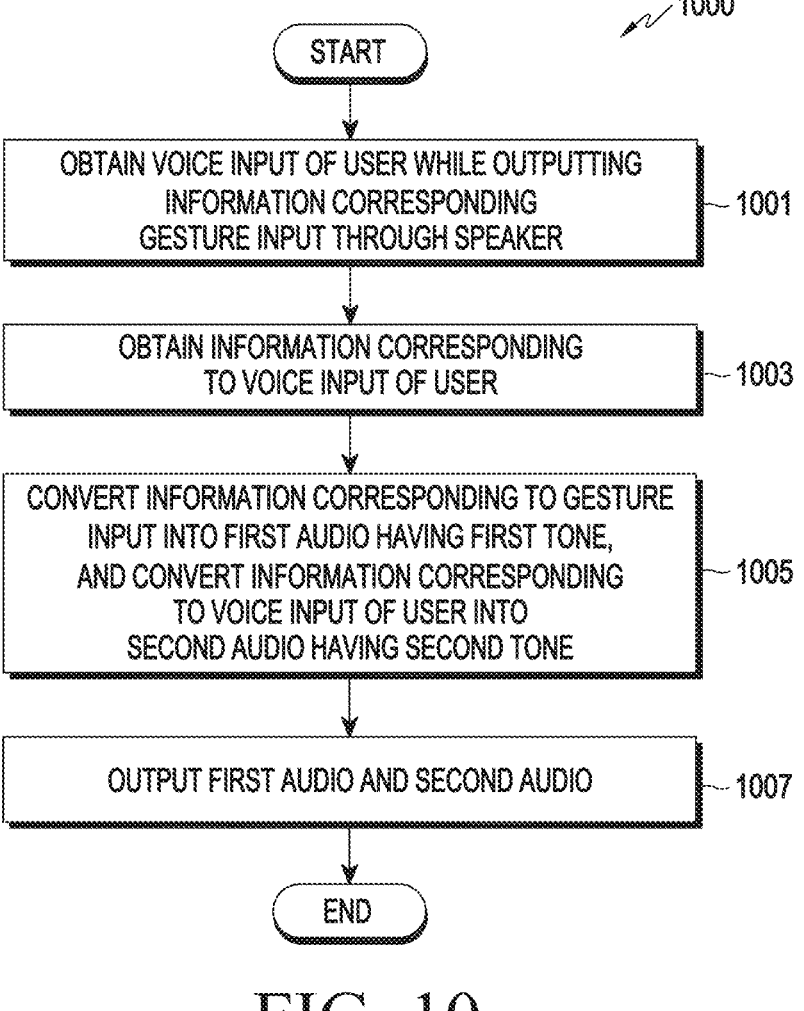
FIG. 10 is a flowchart illustrating an example method of providing information corresponding to a gesture and information corresponding to a voice according to various embodiments.

FIG. 10 is a flowchart 1000 illustrating an example method of providing information corresponding to a gesture and information corresponding to a voice according to various embodiments.

Referring to FIG. 10, in operation 1001, in an embodiment, the processor 570 may obtain a voice input of a user while outputting information corresponding to a gesture input (e.g., audio indicating the information corresponding to the gesture input) through the speaker 540. For example, the processor 570 may obtain a voice input of the user through the first microphone 411 while outputting information corresponding to a gesture input of the user through the speaker 540.

In operation 1003, in an embodiment, the processor 570 may obtain information corresponding to the voice input of the user. For example, the processor 570 may obtain the information corresponding to the voice input of the user by converting a voice of the user into text.

In operation 1005, in an embodiment, the processor 570 may convert the information corresponding to the gesture input into first audio having a first tone, and may convert the information corresponding to the voice input of the user into second audio having a second tone.

In an embodiment, the processor 570 may determine to apply different tones to the first audio indicating the information corresponding to the gesture input and the second audio indicating the information corresponding to the voice input of the user. For example, the processor 570 may determine to apply a male tone to the first audio indicating the information corresponding to the gesture input and to apply a female tone to the second audio indicating the information corresponding to the voice input of the user.

In operation 1007, in an embodiment, the processor 570 may output the first audio and the second audio through the speaker 540. For example, the processor 570 may mix the first audio having the first tone and the second audio having the second tone, and may output the mixed first audio and second audio through the first speaker 441. However, the disclosure is not limited to this example, and the processor 570 may output the first audio and the second audio through the first speaker 441 without mixing the first audio and the second audio.

In an embodiment, when obtaining the voice input of the user while outputting the information corresponding to the gesture input through the speaker 540, the processor 570 may stop outputting the information corresponding to the gesture input through the speaker 540 as described with reference to FIG. 9 or simultaneously output the information corresponding to the gesture input (e.g., the first audio) and the information corresponding to the voice input of the user (e.g., the second audio), to which the different tones are applied, through the speaker as described with reference to FIG. 10, based on a user input.

Figure 11:
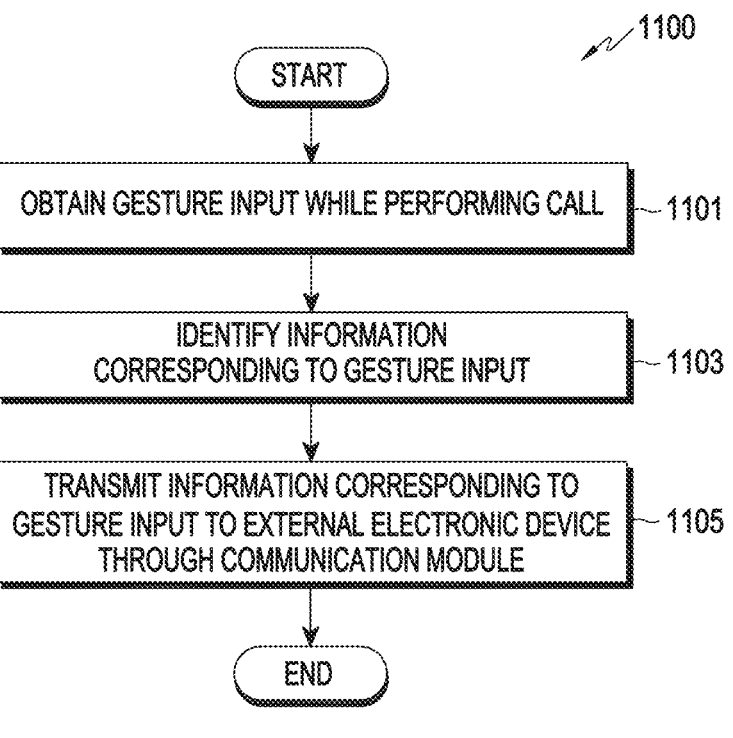
FIG. 11 is a flowchart illustrating an example method of providing information corresponding to a gesture while performing a call according to various embodiments.

FIG. 11 is a flowchart 1100 illustrating an example method of providing information corresponding to a gesture while performing a call according to various embodiments.

Referring to FIG. 11, in operation 1101, in an embodiment, the processor 570 may obtain a gesture input while a user performs a call with a counterpart. For example, the processor 570 may obtain a gesture input of the user, based on an image obtained by the first camera 421, while the user performs a call with the counterpart via the electronic device 401.

In operation 1103, in an embodiment, the processor 570 may identify information corresponding to the gesture input. For example, the processor 570 may convert the gesture input of the user into text, thereby identifying information corresponding to the gesture input (e.g., content of a sign language or information corresponding to a specified gesture).

In operation 1105, in an embodiment, the processor 570 may transmit the information corresponding to the gesture input to an external electronic device (e.g., the electronic device 102 or the electronic device 104) through the communication module 530. For example, the processor 570 may apply a tone of the user (or a tone specified by the user) to audio indicating the information corresponding to the gesture input. The processor 570 may transmit a signal of the audio to which the tone of the user is applied to an electronic device of the counterpart through the communication module 530 so that the signal of the audio is output from the electronic device of the counterpart with whom the user is performing the call.

In an embodiment, the processor 570 may transmit information corresponding to a gesture of the user to the external electronic device through the communication module 530 while the user performs a call with the counterpart, thereby enabling the user to perform the call with the counterpart using the gesture in a quiet place, such as a library.

Although FIG. 11 shows that the processor 570 transmits the signal of the audio indicating the information corresponding to the gesture input to the external electronic device through the communication module 530, the disclosure is not limited thereto. For example, the processor 570 may transmit text indicating the information corresponding to the gesture input (e.g., without converting the text into audio via a TTS program) to the external electronic device through the communication module 530.

In an embodiment, the processor 570 may receive an audio signal indicating information corresponding to a gesture input of the counterpart obtained by the electronic device of the counterpart from the external electronic device through the communication module 530. The processor 570 may output the received audio signal through the second speaker 442.

In an embodiment, the processor 570 may receive text indicating information corresponding to a gesture input of the counterpart obtained by the electronic device of the counterpart from the external electronic device through the communication module 530. The processor 570 may convert the received text into audio via the TTS program, and may output the converted audio through the second speaker 442.

In an embodiment, in the case where the processor 570 obtains the gesture input of the user, based on the image obtained by the first camera 421, while the user performs the call with the counterpart using the electronic device 401, when receiving an audio signal indicating information corresponding to a voice of the counterpart obtained by the electronic device of the counterpart from the external electronic device through the communication module 530, the processor 570 may convert the received audio signal into text, and may output the text through the display 550.

Figure 12:
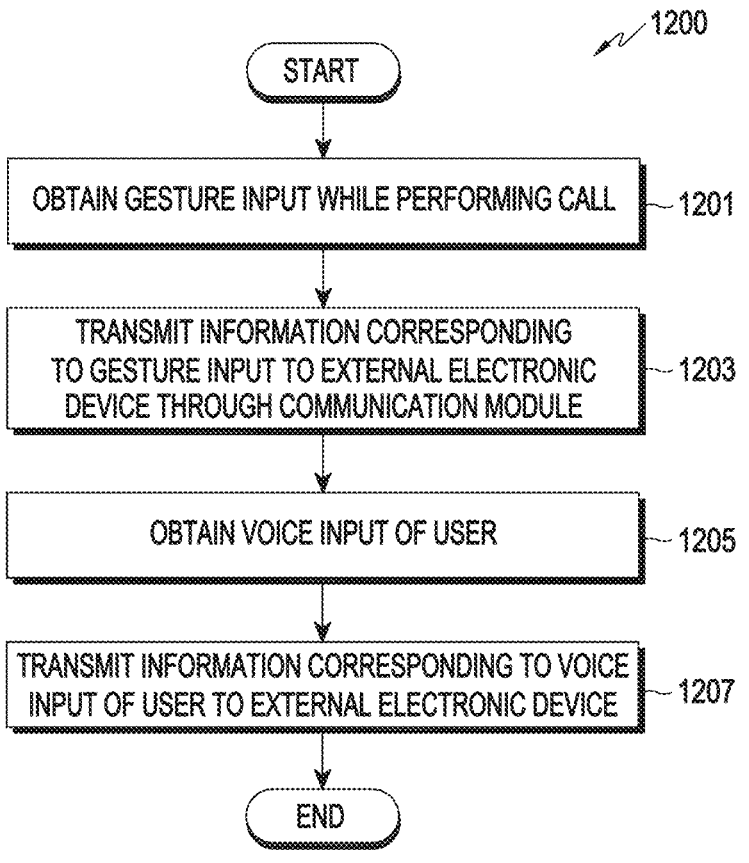
FIG. 12 is a flowchart illustrating an example method of providing information corresponding to a voice of a user while performing a call according to various embodiments.

FIG. 12 is a flowchart 1200 illustrating an example method of providing information corresponding to a voice of a user while performing a call according to various embodiments.

Referring to FIG. 12, in operation 1201, in an embodiment, the processor 570 may obtain a gesture input while the user performs a call with a counterpart. For example, the processor 570 may obtain a gesture input of the user, based on an image obtained by the first camera 421, while the user performs a call with the counterpart using the electronic device 401.

In operation 1203, in an embodiment, the processor 570 may transmit information corresponding to the gesture input to an external electronic device (e.g., the electronic device 102 or the electronic device 104) through the communication module 530.

In operation 1205, in an embodiment, the processor 570 may obtain a voice input of the user through the microphone 510 while transmitting the information corresponding to the gesture input to the external electronic device through the communication module 530. For example, the processor 570 may obtain the voice input of the user through the first microphone 411 while transmitting the information corresponding to the gesture input to the external electronic device through the communication module 530.

In operation 1207, in an embodiment, the processor 570 may stop transmitting the information corresponding to the gesture input to the external electronic device through the communication module 530, and may transmit information corresponding to the voice input of the user to the external electronic device through the communication module 530.

In an embodiment, when the user moves to a place where a call using a voice is possible while performing a call with the counterpart using a gesture in a quiet place, such as a library, the processor 570 may stop transmitting the information corresponding to the gesture input to the external electronic device through the communication module 530, and may transmit the information corresponding to the voice input of the user (an audio signal indicating the information corresponding to the voice input of the user) to the external electronic device through the communication module 530.

Figure 13:
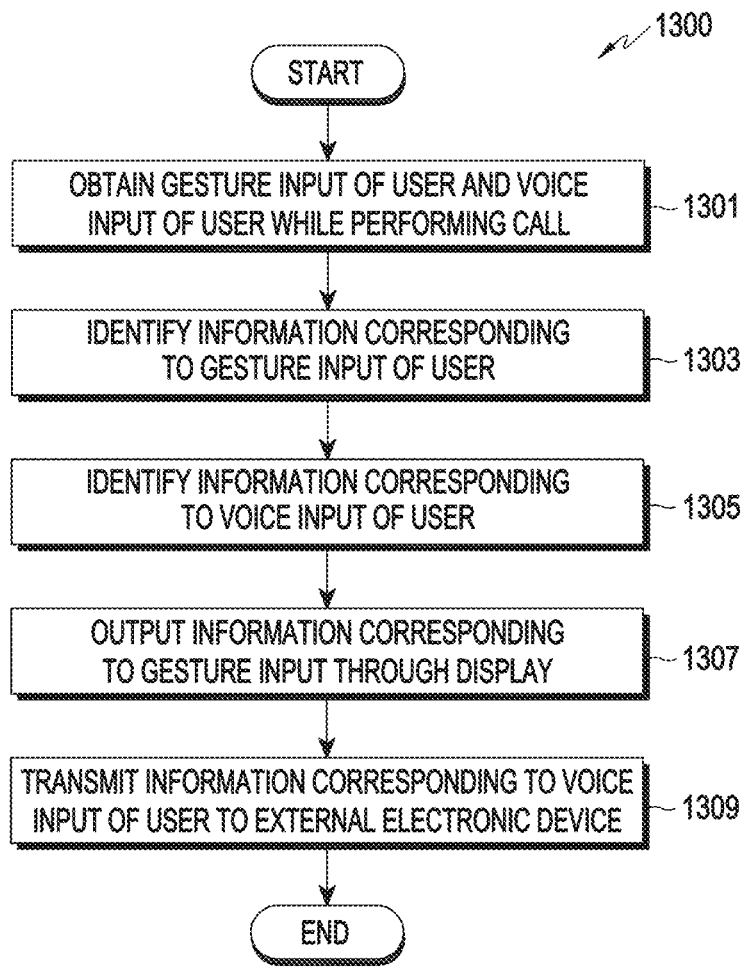
FIG. 13 is a flowchart illustrating an example method of providing information corresponding to a gesture and information corresponding to a voice while performing a call according to various embodiments.

FIG. 13 is a flowchart 1300 illustrating an example method of providing information corresponding to a gesture and information corresponding to a voice while performing a call according to various embodiments.

In an embodiment, FIG. 13 shows an operation of the electronic device 401 performed when a user displays information corresponding to a gesture input of the user to a counterpart on the display 550 and transmits information corresponding to a voice input of the user to the counterpart on a call.

Referring to FIG. 13, in operation 1301, in an embodiment, the processor 570 may obtain a gesture input of the user and a voice input of the user while performing a call. For example, the processor 570 may obtain a gesture input of the user, based on an image obtained by the first camera 421, and obtain a voice input of the user through the first microphone 411 while performing a call with the counterpart.

In operation 1303, in an embodiment, the processor 570 may identify information corresponding to the gesture input of the user. For example, the processor 570 may convert the gesture input of the user into text, thereby identifying the information corresponding to the gesture input (e.g., content of a sign language or information corresponding to a specified gesture).

In operation 1305, in an embodiment, the processor 570 may identify information corresponding to the voice input of the user. For example, the processor 570 may convert the voice input of the user into text, thereby obtaining the information corresponding to the voice input of the user.

In operation 1307, in an embodiment, the processor 570 may output the information corresponding to the gesture input through the display 550. For example, the processor 570 may display an external screen including text indicating information corresponding to the gesture input on the display 550 so that the counterpart adjacent to the electronic device 401 may view the external screen.

In operation 1309, in an embodiment, the processor 570 may transmit the information corresponding to the voice input of the user to an external electronic device through the communication module 530. For example, the processor 570 may transmit an audio signal indicating the information corresponding to the voice input of the user to an electronic device of the counterpart on the call through the communication module 530.

Figure 14:
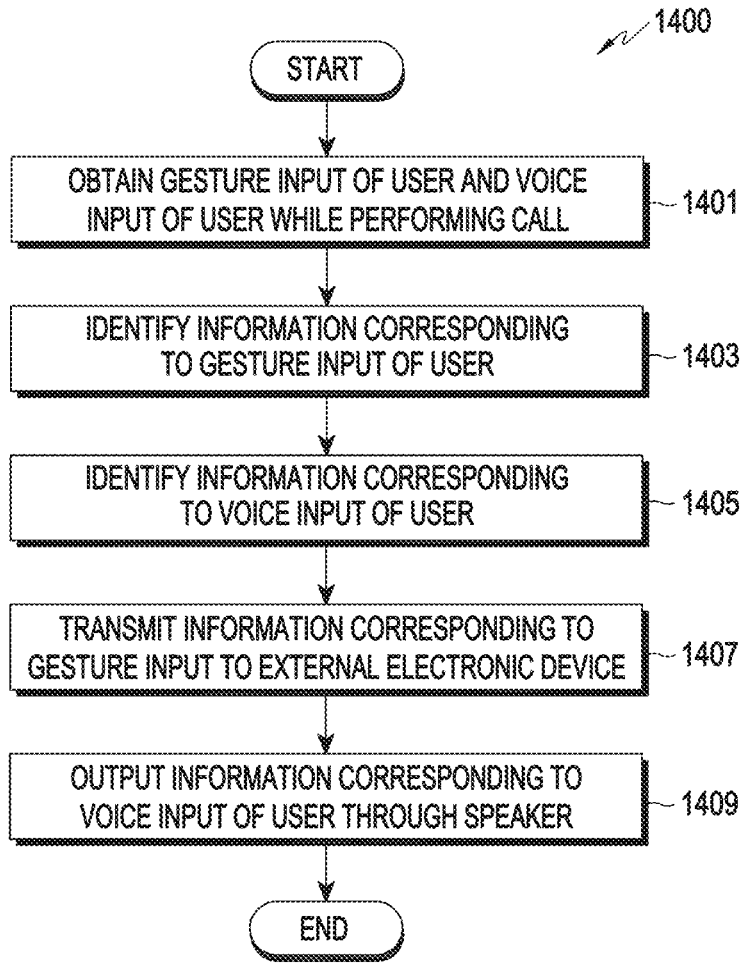
FIG. 14 is a flowchart illustrating an example method of providing information corresponding to a gesture and information corresponding to a voice while performing a call according to various embodiments.

FIG. 14 is a flowchart 1400 illustrating an example method of providing information corresponding to a gesture and information corresponding to a voice while performing a call according to various embodiments.

In an embodiment, FIG. 14 shows an operation of the electronic device 401 performed when a user transmits information corresponding to a gesture input of the user to a counterpart on a call and transmits information corresponding to a voice input of the user to the counterpart adjacent to the electronic device 401.

Referring to FIG. 14, in operation 1401, in an embodiment, the processor 570 may obtain a gesture input of the user and a voice input of the user while performing a call. For example, the processor 570 may obtain a gesture input of the user, based on an image obtained by the first camera 421, and obtain a voice input of the user through the first microphone 411 while performing a call with the counterpart.

In operation 1403, in an embodiment, the processor 570 may identify information corresponding to the gesture input of the user. For example, the processor 570 may convert the gesture input of the user into text, thereby identifying the information corresponding to the gesture input (e.g., content of a sign language or information corresponding to a specified gesture).

In operation 1405, in an embodiment, the processor 570 may identify information corresponding to the voice input of the user. For example, the processor 570 may convert the voice input of the user into text, thereby obtaining the information corresponding to the voice input of the user.

In operation 1407, in an embodiment, the processor 570 may transmit the information corresponding to the gesture input of the user to an external electronic device through the communication module 530. For example, the processor 570 may apply a tone of the user (or a tone specified by the user) to audio indicating the information corresponding to the gesture input of the user. The processor 570 may transmit a signal of the audio to which the tone of the user is applied to an electronic device of the counterpart on the call through the communication module 530. In an embodiment, the processor 570 may control the information corresponding to the voice input of the user not to be transmitted to the electronic device of the counterpart on the call while transmitting the information corresponding to the gesture input of the user to the external electronic device through the communication module 530.

In operation 1409, in an embodiment, the processor 570 may output the information corresponding to the voice input of the user through the speaker 540. For example, the processor 570 may output the information corresponding to the voice input of the user through the first speaker 441. However, the disclosure is not limited to this example. The processor 570 may not output the information corresponding to the voice input of the user through the first speaker 441 or may deactivate the first speaker 441 so that a voice made by the user is directly transmitted to the counterpart adjacent to the electronic device 401.

In an embodiment, the processor 570 may output the information corresponding to the gesture of the user through the first speaker 441 and transmit the information corresponding to the voice input of the user to the external electronic device through the communication module 530, or may transmit the information corresponding to the gesture of the user to the external electronic device through the communication module 530 and output the information corresponding to the voice input of the user through the first speaker 441, based on a user input.

Figure 15:
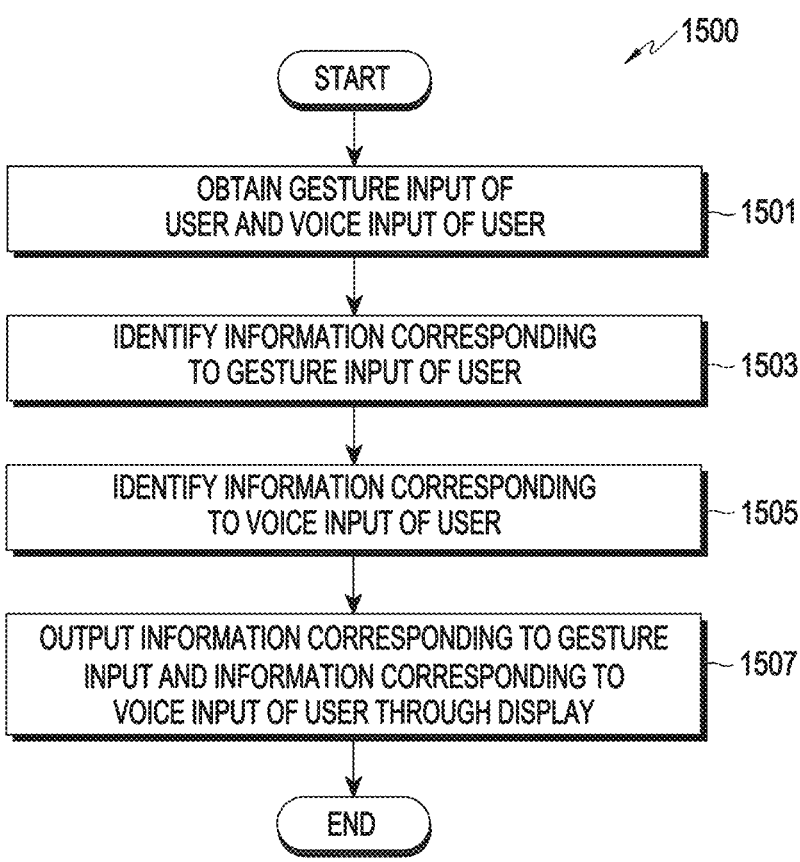
FIG. 15 is a flowchart illustrating an example method of providing information corresponding to a gesture and information corresponding to a voice according to various embodiments.

FIG. 15 is a flowchart 1500 illustrating an example method of providing information corresponding to a gesture and information corresponding to a voice according to various embodiments.

Referring to FIG. 15, in operation 1501, in an embodiment, the processor 570 may obtain a gesture input of a user and a voice input of the user.

In an embodiment, the processor 570 may obtain a facial expression of the user and/or health information about in addition to the gesture input of the user and the voice input of the user.

In operation 1503, in an embodiment, the processor 570 may identify information corresponding to the gesture input of the user.

In operation 1505, in an embodiment, the processor 570 may identify information corresponding to the voice input of the user.

In an embodiment, the processor 570 may identify content indicating the facial expression of the user (or an emotion corresponding to the input facial expression of the user) and the health information.

In operation 1507, in an embodiment, the processor 570 may output the information corresponding to the gesture input of the user and the information corresponding to the voice input of the user (and/or the content indicating the facial expression of the user and the health information) through the display 550.

In an embodiment, the processor 570 may control the display 550 to output texts of the information corresponding to the gesture input of the user and the information corresponding to the voice input of the user (and/or the content indicating the facial expression of the user and the health information) in different sizes, different colors, different text display areas on a transparent member, and/or different languages so that the information corresponding to the gesture input of the user and the information corresponding to the voice input of the user (and/or the content indicating the facial expression of the user and the health information) are distinguished from each other.

Although not shown in FIG. 15, in an embodiment, the processor 570 may output the information corresponding to the gesture input of the user and the information corresponding to the voice input of the user (and/or the content indicating the facial expression of the user and the health information) via an avatar corresponding to the user. For example, the processor 570 may control the display 550 so that the avatar corresponding to the user performs a movement corresponding to the gesture input of the user and makes an expression corresponding to the facial expression of the user (or to display a graphic object or text indicating that the avatar is thinking). The processor 570 may display an external screen including the avatar on the display 550 so that an image (and text) using the avatar is normally seen to a counterpart. In an embodiment, the processor 570 may display an external screen including an image (and text) using the avatar in a first area of the display 550, and may displays an internal screen including an image (and text) using the avatar in a second area of the display 550. The processor 570 may apply a tone of the avatar corresponding to the user to audio indicating the information corresponding to the voice input of the user, and may output the audio to which the tone of the avatar is applied through the first speaker 441.

Figure 16:
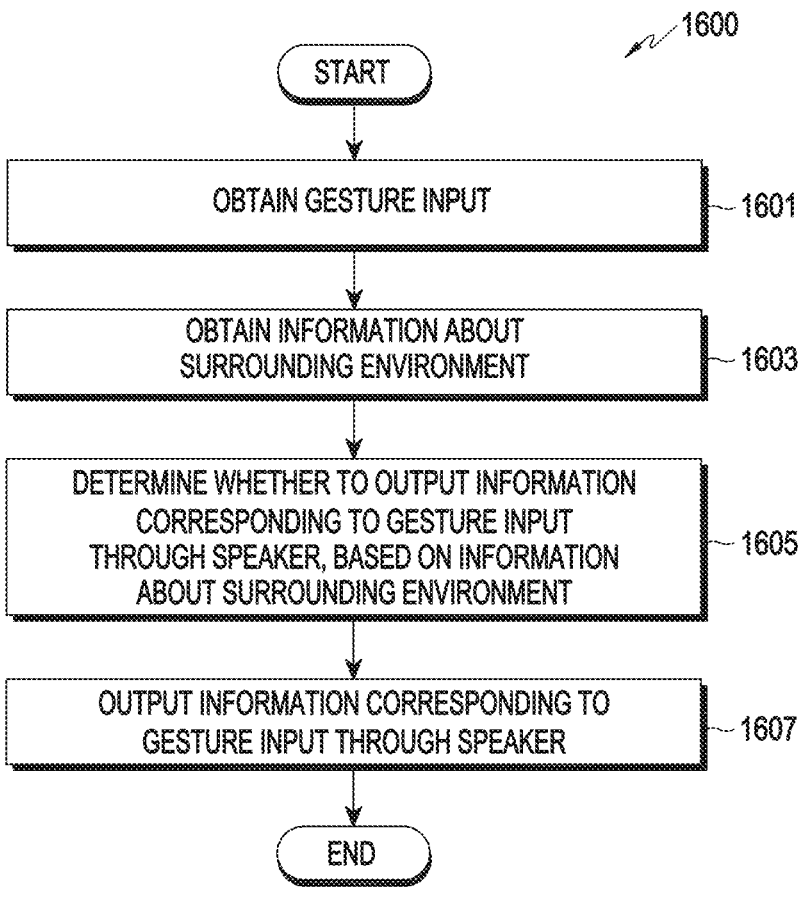
FIG. 16 is a flowchart illustrating an example method of providing information, based on a surrounding environment according to various embodiments.

FIG. 16 is a flowchart 1600 illustrating an example method of providing information, based on a surrounding environment according to various embodiments.

Referring to FIG. 16, in operation 1601, in an embodiment, the processor 570 may obtain a gesture input. For example, the processor 570 may obtain a gesture input of a user and/or a gesture input of a counterpart, based on an image obtained by the first camera 421.

In operation 1603, in an embodiment, the processor 570 may obtain information about a surrounding environment of the electronic device 401. For example, the processor 570 may obtain an ambient sound, brightness outside the electronic device 401, and/or the distance between the electronic device 401 and the counterpart.

In operation 1605, in an embodiment, the processor 570 may determine whether to output information corresponding to the gesture input through the speaker 540, based on the information about the surrounding environment. For example, the processor 570 may determine whether to output the information corresponding to the gesture input through one or more speakers (e.g., the first speaker 441 and the second speaker 442) and/or through the display 550, based on the information about the surrounding environment.

In an embodiment, the processor 570 may determine whether to output the information corresponding to the gesture input through the speaker 540, based on the ambient sound. For example, when the level of the ambient sound is a specified level or higher, the processor 570 may determine to output text indicating information corresponding to the gesture input of the counterpart through the display 550. When the level of the ambient sound is lower than the specified level, the processor 570 may determine to output audio indicating the information corresponding to the gesture input of the counterpart through the second speaker 442.

In an embodiment, the processor 570 may determine whether to output the information corresponding to the gesture input through the speaker 540, based on the brightness outside the electronic device 401. For example, when the brightness outside the electronic device 401 is a specified brightness or higher, the processor 570 may determine to output the audio indicating the information corresponding to the gesture input of the counterpart through the second speaker 442. When the brightness outside the electronic device 401 is lower than the specified brightness, the processor 570 may determine to output an internal screen including the text indicating the information corresponding to the gesture input of the counterpart through the display 550.

In an embodiment, the processor 570 may determine whether to output the information corresponding to the gesture input through the speaker, based on the distance between the electronic device 401 and the counterpart. For example, when the distance between the electronic device 401 and the counterpart is a specified distance or greater, the processor 570 may determine to output the audio indicating the information corresponding to the gesture input of the counterpart through the second speaker 442. When the distance between the electronic device 401 and the counterpart is less than the specified distance, the processor 570 may determine to output the internal screen including the text indicating the information corresponding to the gesture input of the counterpart through the display 550. In another example, when the distance between the electronic device 401 and the counterpart increases, the processor 570 may determine to output the audio indicating the information corresponding to the gesture input of the counterpart through the second speaker 442. When the distance between the electronic device 401 and the counterpart decreases, the processor 570 may determine to output the internal screen including the text indicating the information corresponding to the gesture input of the counterpart through the display 550.

In operation 1607, in an embodiment, when determining to output the information corresponding to the gesture through the speaker 540, the processor 570 may output the information corresponding to the gesture through the speaker 540.

Figure 17:
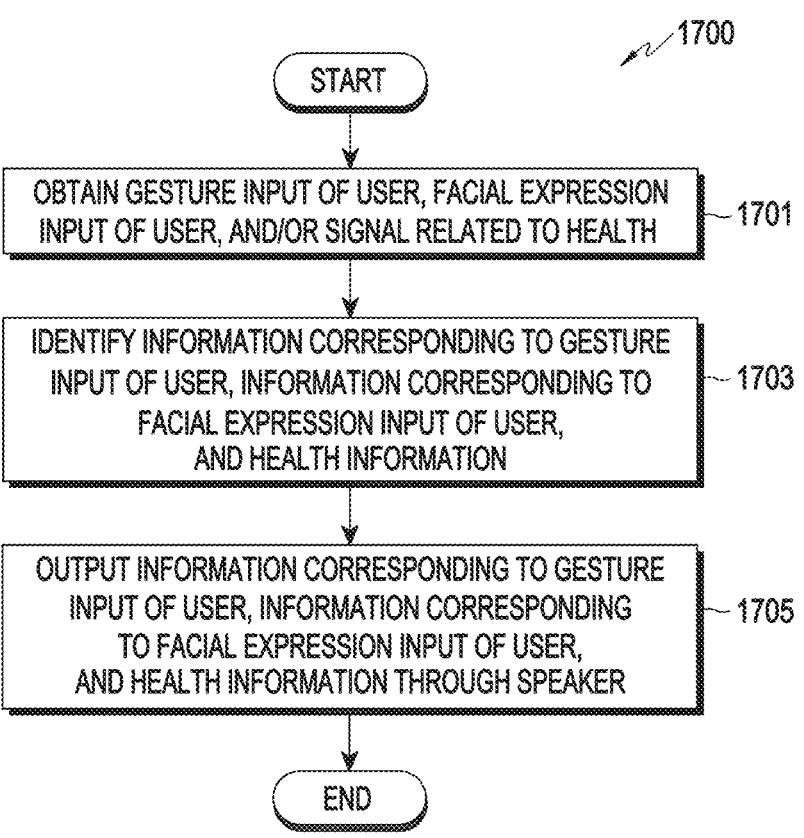
FIG. 17 is a flowchart illustrating an example method of providing information corresponding to a plurality of inputs according to various embodiments.

FIG. 17 is a flowchart 1700 illustrating an example method of providing information corresponding to a plurality of inputs according to various embodiments.

Referring to FIG. 17, in operation 1701, in an embodiment, the processor 570 may obtain a gesture input of a user, a facial expression of the user, and/or health information about the user (and a user input via a virtual keyboard).

In operation 1703, in an embodiment, the processor 570 may identify information corresponding to the gesture input of the user, information corresponding to the facial expression of the user, and/or information corresponding to the health information about the user.

In operation 1705, in an embodiment, the processor 570 may output the information corresponding to the gesture input of the user, the information corresponding to the facial expression of the user, and/or the information corresponding to the health information about the user through the speaker 540.

In an embodiment, the processor 570 may apply different tones to the information corresponding to the gesture input of the user, the information corresponding to the facial expression of the user, and/or the information corresponding to the health information about the user, respectively. For example, the processor 570 may apply a female tone to first audio indicating the information corresponding to the gesture input of the user, a male tone to second audio indicating the information corresponding to the facial expression of the user, and a machine tone to the information corresponding to the health information about the user.

In an embodiment, the processor 570 may apply different audio levels (e.g., volumes) to the information corresponding to the gesture input of the user, the information corresponding to the facial expression of the user, and/or the information corresponding to the health information about the user, respectively.

In an embodiment, the processor 570 may determine the order in which the information corresponding to the gesture input of the user, the information corresponding to the facial expression of the user, and/or the information corresponding to the health information about the user are sequentially output.

In an embodiment, processor 570 may output the information corresponding to the gesture input of the user, the information corresponding to the facial expression of the user, and/or the information corresponding to the health information about the user through the first speaker 441, based on the determined tones, audio levels, and/or output order. For example, in an embodiment, the processor 570 may mix the first audio indicating the information corresponding to the gesture input of the user, the second audio indicating the information corresponding to the facial expression of the user, and/or third audio indicating the information corresponding to the health information about the user, based on the determined tones, audio levels, and/or output order, and may output the audios through the first speaker 441.

In an embodiment, the processor may determine whether to output the information corresponding to the input through the speaker, based on information about the user and/or information about a counterpart. For example, when the user is hearing-impaired, the processor may display a voice of the counterpart in text on the display 451. For example, when a gesture indicating a sign language is input from the counterpart and the user does not know the sign language, the processor may output the gesture indicating the sign language input by the counterpart in a voice and/or text. For example, in a case where the counterpart is hearing-impaired (e.g., a hearing-impaired person who knows a sign language) and the user does not know the sign language, when a voice of the user is input, the processor may display the input voice of the user in text on the display 451.

A method in which an electronic device provides information according to various example embodiments of the disclosure may include: obtaining an input through one or more input modules (e.g., the microphone 510 and the camera 520) of the electronic device, identifying a type of the input, determining whether to output information corresponding to the input through one or more speakers (e.g., the speaker 540), and controlling the one or more speakers (e.g., the speaker 540) so that the information corresponding to the input is output based on the type of the input through the one or more speakers (e.g., the speaker 540), based on determining to output the information corresponding to the input through the one or more speakers (e.g., the speaker 540).

In various example embodiments, the method may further include converting the obtained input into text.

In various example embodiments, the determining whether to output the information corresponding to the input through the one or more speakers (e.g., the speaker 540) may include determining whether to output the information corresponding to the input through the one or more speakers (e.g., the speaker 540), based on at least one of a user input or the type of the input.

In various example embodiments, the determining whether to output the information corresponding to the input through the one or more speakers may include determining to output information corresponding to a gesture and/or a voice of a user of the electronic device through a first speaker among the one or more speakers when the type of the input is the gesture and/or the voice of the user and determining to output information corresponding to a gesture and/or a voice of a counterpart through a second speaker among the one or more speakers when the type of the input is the gesture and/or the voice of the counterpart.

In various example embodiments, the determining whether to output the information corresponding to the input through the one or more speakers (e.g., the speaker 540) may include determining a tone to be applied to audio indicating the information corresponding to the input.

In various example embodiments, the obtaining of the input may include: obtaining a plurality of inputs through the one or more input modules (e.g., the microphone 510 and the camera 520), and the determining of the tone to be applied to the audio indicating the information corresponding to the input may include determining different tones to be applied to audios that indicate information corresponding to the plurality of inputs and are to be simultaneously output, based on a type of the plurality of inputs.

In various example embodiments, the obtaining of the plurality of inputs through the one or more input modules (e.g., the microphone 510 and the camera 520) may include: obtaining a gesture input of a user of the electronic device and a voice input of the user through the one or more input modules (e.g., the microphone 510 and the camera 520), and the determining of the different tones to be applied to the audios that indicate information corresponding to the plurality of inputs and are to be simultaneously output, based on the type of the plurality of inputs may include determining a first tone to be applied to first audio indicating information corresponding to the gesture input of the user and a second tone to be applied to second audio that indicates information corresponding to the voice input of the user and is to be output simultaneously with the first audio.

In various example embodiments, the determining whether to output the information corresponding to the input through the one or more speakers may include: determining to display information corresponding to a gesture and/or a voice of a user of the electronic device on an external screen of the display (e.g., the display 550) when the type of the input is the gesture and/or the voice of the user and determining to output information corresponding to a gesture and/or a voice of a counterpart on an internal screen of the display (e.g., the display 550) based on the type of the input being the gesture and/or the voice of the counterpart.

In various example embodiments, the method may further include: transmitting information corresponding to a gesture of a user of the electronic device to an external electronic device through a communication module (e.g., the communication module 530) of the electronic device based on receiving the gesture of the user while the electronic device performs a call with the external electronic device.

In various example embodiments, the method may further include: obtaining information about a surrounding environment of the electronic device and determining whether to output the information corresponding to the input through the one or more speakers (e.g., the speaker 540), based on the information about the surrounding environment of the electronic device.

In various example embodiments, the electronic device may include: augmented reality (AR) glasses, and the input may include at least one of a gesture of a user of the electronic device, a gesture of a counterpart positioned adjacent to the electronic device, a voice of the user, a voice of the counterpart, a facial expression of the user, or health information about the user.

A data structure used in the foregoing example embodiments of the disclosure may be recorded in a non-transitory computer-readable recording medium through various methods. The non-transitory computer-readable recording medium may include a storage medium, such as a magnetic storage medium (e.g., ROM, floppy disk, or hard disk) or an optical reading medium (e.g., CD-ROM or DVD).

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
one or more input modules comprising input circuitry;
a plurality of speakers including a first speaker disposed at a first position and a second speaker disposed at a second position different from the first position, the first speaker being a mono speaker, the second speaker being a pair of stereo speakers;
a display;
at least one processor comprising processing circuitry; and
memory storing instructions that, when executed by at least one processor individually and/or collectively, cause the electronic device to:
obtain an input through the one or more input modules;

identify a type of the input;
determine whether to output information corresponding to the input through the at least one speaker among the plurality of speakers;
control the at least one speaker so that the information corresponding to the input is output based on the type of the input through the at least one speaker, based on determining to output the information corresponding to the input through the at least one speaker,
wherein based on the type of the input being a gesture and/or a voice of the user of the electronic device, information corresponding to the gesture and/or the voice of the user is outputted through the first speaker, and
wherein based on the type of the input being a gesture and/or a voice of a counterpart, information corresponding to the gesture and/or the voice of the counterpart is outputted through the second speaker.

2. The electronic device of claim 1, wherein the instructions, when executed by at least one processor individually and/or collectively, further cause the electronic device to:
convert the obtained input into a text.

3. The electronic device of claim 1, wherein the instructions, when executed by at least one processor individually and/or collectively, cause the electronic device to:
determine whether to output the information corresponding to the input through the at least one speaker, based on at least one of a user input or the type of the input.

4. The electronic device of claim 1, wherein the instructions, when executed by at least one processor individually and/or collectively, cause the electronic device to:
determine a tone to be applied to audio indicating the information corresponding to the input.

5. The electronic device of claim 4, wherein the instructions, when executed by at least one processor individually and/or collectively, cause the electronic device to:
obtain a plurality of inputs through the one or more input modules; and
determine different tones to be applied to audios that indicate information corresponding to the plurality of inputs and are to be simultaneously output, based on a type of the plurality of inputs.

6. The electronic device of claim 5, wherein the instructions, when executed by at least one processor individually and/or collectively, cause the electronic device to:
obtain a gesture input of a user of the electronic device and a voice input of the user through the one or more input modules; and
determine a first tone to be applied to first audio indicating information corresponding to the gesture input of the user and a second tone to be applied to second audio that indicates information corresponding to the voice input of the user and is to be output simultaneously with the first audio.

7. The electronic device of claim 1, wherein the instructions, when executed by at least one processor individually and/or collectively, cause the electronic device to:
determine to display information corresponding to the gesture and/or the voice of the user of the electronic device through a first screen, for the counterpart, of the display based on the type of the input being the gesture and/or the voice of the user; and
determine to output information corresponding to the gesture and/or the voice of the counterpart on a second screen, for the user, of the display based on the type of the input being the gesture and/or the voice of the counterpart.

8. The electronic device of claim 1, further comprising a communication module, comprising communication circuitry, wherein the instructions, when executed by at least one processor individually and/or collectively, further cause the electronic device to:

transmit information corresponding to the gesture of the user of the electronic device to an external electronic device through the communication module based on receiving the gesture of the user while the electronic device performs a call with the external electronic device.

9. The electronic device of claim 1, wherein the instructions, when executed by at least one processor individually and/or collectively, further cause the electronic device to:

obtain information about a surrounding environment of the electronic device; and determine whether to output the information corresponding to the input through the at least one speaker, based on the information about the surrounding environment of the electronic device.

10. A method of providing information by an electronic device, the method comprising:

obtaining an input through one or more input modules of the electronic device;

identifying a type of the input;

determining whether to output information corresponding to the input through at least one speaker among a plurality of speakers including a first speaker disposed at a first position and a second speaker disposed at a second position different from the first position, the first speaker being a mono speaker, the second speaker being a pair of stereo speakers; and controlling the at least one speaker so that the information corresponding to the input is output based on the type of the input through the at least one speaker, based on determining to output the information corresponding to the input through the at least one speaker, wherein based on the type of the input being a gesture and/or a voice of the user of the electronic device, information corresponding to the gesture and/or the voice of the user is outputted through the first speaker, and wherein based on the type of the input being a gesture and/or a voice of a counterpart, information corresponding to the gesture and/or the voice of the counterpart is outputted through the second speaker.

11. The method of claim 10, further comprising converting the obtained input into a text.

12. The method of claim 10, wherein the determining of whether to output the information corresponding to the input through the at least one speaker comprises:

determining whether to output the information corresponding to the input through the at least one speaker, based on at least one of a user input or the type of the input.

13. The method of claim 10, wherein the determining of whether to output the information corresponding to the input through the at least one speaker comprises determining a tone to be applied to audio indicating the information corresponding to the input.

14. The method of claim 13, wherein the obtaining of the input comprises obtaining a plurality of inputs through the one or more input modules, and wherein the determining of the tone to be applied to the audio indicating the information corresponding to the input comprises determining different tones to be applied to audios that indicate information corresponding to the plurality of inputs and are to be simultaneously output, based on a type of the plurality of inputs.

15. The method of claim 14, wherein the obtaining of the plurality of inputs through the one or more input modules comprises:

obtaining a gesture input of a user of the electronic device and a voice input of the user through the one or more input modules, and wherein the determining of the different tones to be applied to the audios that indicate information corresponding to the plurality of inputs and are to be simultaneously output, based on the type of the plurality of inputs comprises determining a first tone to be applied to first audio indicating information corresponding to the gesture input of the user and a second tone to be applied to second audio that indicates information corresponding to the voice input of the user and is to be output simultaneously with the first audio.

16. The method of claim 10, wherein the determining whether to output the information corresponding to the input through the at least one speaker comprises:

determining to display information corresponding to the gesture and/or the voice of the user of the electronic device through a first screen, for of the counterpart, of the display based on the type of the input being the gesture and/or the voice of the user; and determining to output information corresponding to the gesture and/or the voice of the counterpart on a second screen, for the user, of the display based on the type of the input being the gesture and/or the voice of the counterpart.

17. The method of claim 10, further comprises:

transmitting information corresponding to the gesture of the user of the electronic device to an external electronic device through a communication module of the electronic device based on receiving the gesture of the user based on the electronic device performing a call with the external electronic device.

18. A non-transitory computer-readable medium storing computer-executable instructions, wherein the computer-executable instructions, when executed by at least one processor of an electronic device individually or collectively, cause the electronic device to:

obtain an input through one or more input modules of the electronic device, identify a type of the input, determine whether to output information corresponding to the input through at least one speaker among a plurality of speakers including a first speaker disposed at a first position and a second speaker disposed at a second position different from the first position, the first speaker being a mono speaker, the second speaker being a pair of stereo speakers, control the at least one speaker so that the information corresponding to the input is output based on the type of the input through the at least one speaker, based on determining to output the information corresponding to the input through the at least one speaker, wherein based on the type of the input being a gesture and/or a voice of the user of the electronic device, information corresponding to the gesture and/or the voice of a user is outputted through the first speaker, and wherein based on the type of the input being a gesture and/or a voice of a counterpart, information corresponding to the gesture and/or the voice of the counterpart is outputted through the second speaker.

\* \* \* \* \*